United States Patent
Yagi et al.

(10) Patent No.: US 10,167,562 B2
(45) Date of Patent: Jan. 1, 2019

(54) PEROVSKITE OXIDE CATALYST FOR OXYGEN EVOLUTION REACTIONS

(71) Applicants: OSAKA PREFECTURE UNIVERSITY PUBLIC CORPORATION, Sakai-shi, Osaka (JP); FUJI DIE CO., LTD., Tokyo (JP)

(72) Inventors: Shunsuke Yagi, Sakai (JP); Ikuya Yamada, Sakai (JP); Kouhei Wada, Tokyo (JP)

(73) Assignees: OSAKA PREFECTURE UNIVERSITY PUBLIC CORPORATION, Sakai-shi (JP); FUJI DIE CO., LTD., Tokyo (JP)

( * ) Notice: Subject to any disclaimer, the term of this patent is extended or adjusted under 35 U.S.C. 154(b) by 249 days.

(21) Appl. No.: 15/169,116

(22) Filed: May 31, 2016

(65) Prior Publication Data
US 2016/0348257 A1 Dec. 1, 2016

(30) Foreign Application Priority Data
Jun. 1, 2015 (JP) .................. 2015-111652

(51) Int. Cl.
C25B 11/04 (2006.01)
C25B 1/04 (2006.01)

(52) U.S. Cl.
CPC ............ C25B 11/0463 (2013.01); C25B 1/04 (2013.01); Y02E 60/366 (2013.01)

(58) Field of Classification Search
CPC ...... B01J 23/002; C25B 1/04; C25B 11/0463; Y02E 60/366
(Continued)

(56) References Cited

U.S. PATENT DOCUMENTS 3,897,367 A * 7/1975 Lauder ................ B01D 53/945
502/303
3,922,204 A * 11/1975 Tseung .................... B01J 23/10
204/421

(Continued)

FOREIGN PATENT DOCUMENTS

| JP | H08-067997 A | 3/1996 |
| JP | 2012-099266 A | 5/2012 |
| WO | 2010/101153 A1 | 9/2010 |

OTHER PUBLICATIONS

Hongping Li et al., "Mechanism of A-B Intersite charge transfer and negative thermal expansion in A-site ordered perovskite LaCu2Fe4O12." Journal of Applied Physics III, pp. 103718-1 to 103718-5 (Year: 2012).*

(Continued)

*Primary Examiner* — Patricia L. Hailey
(74) *Attorney, Agent, or Firm* — Oliff PLC

(57) ABSTRACT

A catalyst for an oxygen evolution reaction has a higher and longer-life catalytic activity than that of the conventional and expensive noble metal oxide catalysts, such as $RuO_2$ and $IrO_2$. An A-site ordered perovskite oxide catalyst (such as $CaCu_3Fe_4O_{12}$ and $CaMn_3Mn_4O_{12}$ etc.) as an oxygen evolution reaction catalyst is excellent in cost effectiveness. The catalyst has a high catalytic activity compared with a noble metal oxide catalyst, and a long repetition use life since it is extremely stable also under the oxidative reaction conditions. Use of the catalyst is expected to the important energy conversion reactions such as a charge reaction of a metal-air battery, an anode oxygen evolution reaction in the case of a direct water decomposition reaction by sunlight, etc.

9 Claims, 24 Drawing Sheets

(58) Field of Classification Search
USPC .................................. 502/300, 302–355, 525
See application file for complete search history.

(56) References Cited

U.S. PATENT DOCUMENTS

| | | | | |
|---|---|---|---|---|
| 4,010,238 | A * | 3/1977 | Shiraishi | B01D 53/9418 423/239.1 |
| 4,049,583 | A * | 9/1977 | Lauder | B01D 53/86 423/213.2 |
| 4,110,254 | A * | 8/1978 | Lauder | B01D 53/945 423/213.5 |
| 4,388,226 | A * | 6/1983 | Derrien | B01J 23/002 502/308 |
| 9,150,476 | B1 * | 10/2015 | Shekhawat | C07C 29/158 |
| 2003/0198582 | A1 * | 10/2003 | Golden | B01D 53/944 423/213.2 |
| 2013/0273441 | A1 | 10/2013 | Chen et al. | |
| 2015/0065333 | A1 * | 3/2015 | Ge | H01M 4/8673 502/1 |
| 2015/0225863 | A1 * | 8/2015 | Taniguchi | C25B 11/0484 205/636 |
| 2016/0340791 | A1 * | 11/2016 | Yang | C25B 11/0447 |

OTHER PUBLICATIONS

Sebastian A. Larregola et al., "New Routes to Synthesizing an Ordered Perovskite CaCu3Fe2Sb2O12 and its Magnetic Structure by Neutron Powder Diffraction." Inorganic Chemistry, 53. pp. 4281-4283. (Year: 2014).*

A. Collomb et al., "Neutron Diffraction and Magnetic Properties of a Series of Ferrimagnetic Oxides with the Perovskite-Like Structure." Journal of Magnetism and Magnetic Materials 7, pp. 1-8. (Year: 1978).*

J. Chenavas et al., "The Synthesis and Crystal Structure of CaCu3Mn4O12: A New Ferromagnetic-Perovskite-like Compound." Journal of Solid State Chemistry 14, pp. 25-32. (Year: 1975).*

Takashi Saito et al., "Control of L-type Ferrimagnetism by the Ce/Vacancy Ordering in the A-Site-Ordered Perovskite Ce1/2Cu3Ti4O12." Inorganic Chemistry, 53, pp. 1578-1584. (Year: 2014).*

Yuichi Shimakawa, "A-Site Ordered Perovskites with Intriguing Physical Properties." Inorganic Chemistry, 47, pp. 8562-8570. Year: 2008).*

Hongtao Yu et al., "Microwave synthesis of high dielectric constant CaCu3Ti4O12." Journal of Materials Processing Technology 208, pp. 145-148. (Year: 2008).*

Ikuya Yamada et al., "Synthesis, Structure, and Physical Properties of A-sited Ordered Perovskites ACu3Co4O12 (A = Ca and Y)." Chem. Mater., 22, pp. 5328-5332. (Year: 2010).*

Fabbri, E, et al., "Developments and Perspectives of Oxide-Based Catalysts for the Oxygen Evolution Reaction." Catal. Sci. Technol. vol. 4, pp. 3800-3821, (2014).

Subbaraman, R. et al., "Trends in activity for the water electrolyser reactions on 3d M(Ni, Co, Fe, Mn) hydr(oxy)oxide catalysts." Nat. Mater. vol. 11, pp. 550-557, (2012).

Lee, Y. et al., "Synthesis and Activities of Rutile IrO2 and RuO2 Nanoparticles for Oxygen Evolution in Acid and Alkaline Solutions." J. Phys. Chem. Lett., vol. 3, pp. 399-404. (2012).

Grimaud, A. et al., "Double perovskites as a family of highly active catalysts for oxygen evolution in alkaline solution." Nat. Commun., vol. 4, pp. 2439-2445. (2013).

Jung, Jae-Il. et al., "A Bifunctional Perovskite Catalyst for Oxygen Reduction and Evolution" Angew.Chem.Int.Ed., vol. 53, pp. 4582-4586. (2014).

Yamada, I. et al., "A perovskite containing quadrivalent iron as a charge-disproportionated ferrimagnet" Angew.Chem.Int.Ed., vol. 47, pp. 7032-7035. (2008).

Jung, J-I. et al., "Fabrication of Ba0.5Sr0.5Co0.8Fe0.2O3-sigma Catalysts with Enhanced Electrochemical Performance by Removing an Inherent Heterogeneous Surface Film Layer," Advanced Materials., vol. 27, pp. 266-271.(2015).

Kakihana, M. et al., "Synthesis and Characteristics of Complex Multicomponent Oxides Prepared by Polymer Complex Method," Bull.Chem.Soc.Jpn. vol. 72, pp. 1427-1443. (1976).

Shannon, "Revised Effective Ionic Radii and Systematic Studies of Interatomic Distances in Halides and Chalcogenides." Acta Cryst., pp. 751-767. (1976).

Oct. 29, 2015 Office Action issued in Japanese Patent Application No. 2015-111652.

Mitsuishi, Y. et al., "Water splitting and CO2 reduction over ALa4Ti4O15 (A = Ca, Sr, and Ba) photocatalysts with layered perovskite structure," Catalysts & Catalysis, vol. 51, No. 2, pp. 84-86, (2009).

* cited by examiner

PEROVSKITE OXIDE CATALYST FOR OXYGEN EVOLUTION REACTIONS

TECHNICAL FIELD

The present invention relates to a perovskite oxide catalyst for an oxygen evolution reaction. In more detail, it relates to an A-site ordered perovskite oxide catalyst whose oxygen evolution efficiency is very high.

BACKGROUND ART

An oxygen evolution reaction (those with abbreviating to "OER" hereafter.) is a reaction which arises in the oxidation process of water. This reaction is an important energy conversion reaction in the charge reaction of a metal-air battery, and the direct water decomposition reaction by sunlight (refer to nonpatent documents 1, by Fabbri E. et al., and 2, by Subbaraman R. et al.). Hereinafter, the oxygen evolution reaction (OER) and "the catalyst for oxygen evolution reactions (it is also called the catalyst for OER)" as used in this description are explained by exemplifying these reactions.

For example, the direct water decomposition reaction by sunlight is represented by the following reaction formulas (I) and (II).

(Cathode) $2H^+ + 2e^- \rightarrow H_2$           (I)

(Anode) $2H_2O \rightarrow O_2 + 4H^+ + 4e^-$           (II)

That is, in a cathode, hydrogen is evolved and an oxygen evolution reaction occurs in an anode. The catalyst which promotes this oxygen evolution reaction is a catalyst for oxygen evolution reactions.

When a discharge reaction of the metal-air battery is shown in the case of divalent metal (Zn) as a metal, the discharge reaction is represented by the following reaction formulas (III)-(V):

(Negative electrode) $Zn + 2OH^- \rightarrow ZnO + H_2O + 2e^-$           (III)

(Positive electrode) $O_2 + 2H_2O + 4e^- \rightarrow 4OH^-$           (IV)

(Overall reaction of discharge) $Zn + 1/2 O_2 \rightarrow ZnO$           (V).

On the other hand, a charge reaction as a reverse reaction thereof is represented by the following reaction formulas (VI)-(VIII):

(Negative electrode) $ZnO + H_2O + 2e^- \rightarrow Zn + 2OH^-$           (VI)

(Positive electrode) $4OH^- \rightarrow O_2 + 2H_2O + 4e^-$           (VII)

(Overall reaction of charge) $ZnO \rightarrow Zn + 1/2 O_2$           (VIII).

That is, it becomes the oxygen reduction reaction (IV) during discharge, and it becomes the oxygen evolution reaction (VII) during charge. Therefore, since the oxygen evolution reaction (OER) of the present invention is represented by the above-mentioned reaction formula (VII), it turns out that OER is a reaction in the positive electrode during charge. Thus, in order to raise the charging efficiency of the metal-air battery, development of the catalyst (catalyst for oxygen evolution reactions) which raises the oxygen evolution reaction efficiency of reaction formula (VII) becomes important.

Since an oxygen evolution electrode (also called as an "air electrode" hereafter) is put to oxygen environment with high potential during charge, a catalyst and an electrode material are required to have high oxidation resistance.

From the past, as a catalyst which can meet these demands for the oxygen evolution reaction, noble metal oxide catalysts, such as $RuO_2$ and $IrO_2$, are used, and nano particle forms etc. are further tried for the improvement in performance (for example, refer to Non-patent Document 3, such as Lee, Y. et al.).

However, the demand to develop a catalyst which exceeds the performance of the noble metal oxide catalysts of the conventional and which is excellent in cost effectiveness for the oxygen evolution reaction is not yet attained.

One of the trials to this demand is use of a perovskite oxide catalyst. Noting that it may become the material excellent in cost effectiveness, since a perovskite oxide catalyst has comparatively high catalytic activity to OER, many examinations have been applied to the perovskite oxide catalysts (for example, refer to the non-patent document 1, such as Fabbri, E., as a review article.). Patent document 1 regarding perovskite oxide $La_{0.7}Sr_{0.3}CoO_3$ as an air electrode catalyst material in a metal air battery, and similarly, refer to patent document 2 regarding perovskite oxide $La_{1-x}Sr_xFeO_3$ (provided that, x=0.1-0.2) as an oxygen generating electrode material. However, the OER reaction activity of these perovskite oxide catalysts and stability over repeated use are not enough yet as shown in FIG. 1 and FIG. 2, and a further improvement is desired.

On the other hand, Yamada et al. of the present inventor succeeded in synthesizing a perovskite oxide $CaCu_3Fe_4O_{12}$ of an A-site ordered of a novel structure for the first time in the world by using a high pressure process (refer to non-patent document 6 of I. Yamada et al.). In the patent document 3, in order to correspond to the high-density and large-capacity of the optical component in recent years, prevention or inhibition of thermal expansion was considered as a subject. As a result, as a metal oxide material the volume of which decreases in a practical temperature range, the A-site ordered perovskite oxides which have compositions of $LaCu_3Fe_4O_{12}$ and $BiCu_3Fe_4O_{12}$ are disclosed in the document. However, in these references, there is no instruction or suggestion regarding the use of the A-site ordered perovskite oxide as a catalyst for oxygen evolution reactions.

PRIOR ART DOCUMENTS

Patent Documents

[Patent document 1] JP2012-099266 A
[Patent document 2] JPHei08-067997A
[Patent document 3] Republication (A1) WO 2010/101153

Non-Patent Documents

[Nonpatent document 1] Fabbri, E., et al., Developments and perspectives of oxide-based catalysts for the oxygen evolution reaction, Catal. Sci. Tecnol. 4, 3800-3821 (2014).
[Nonpatent document 2] Subbaraman, R., et al., and Trends in activity for the water eletrolyser reactions on 3d M (Ni, Co, Fe, Mo) hydr(oxy) oxide catalysts., Nat. Mater. 11, 550-557 (2012).
[Nonpatent document 3] Lee, Y, et al., Synthesis and activities of ruffle $IrO_2$ and $RuO_2$ nanoparticles for oxygen evolution in acid and alkaline solutions, J. Phys. Chem. Lett. 3, 399-404 (2012).
[Nonpatent document 4] Grimaud, A., et al., Double perovskites as a family of highly active catalysts for oxygen evolution in alkaline solution, Nat. Commun., 4, 2439-2445 (2013).

[Nonpatent document 5] Jung, J.-I., et al., Bifunctional Perovskite Catalyst for Oxygen Reduction and Evolution, Angew. Chem. Int. Ed., 53, 4582-4586 (2014).

[Nonpatent document 6] I. Yamada and et al., A perovskite containing quadrivalent iron as a charge-disproportionated ferrimagnet, Angew. Chem. Int. Ed., 47, 7032-7035 (2008).

[Nonpatent document 7] Jung, J.-I., et al., Fabrication of $Ba_{0.5}Sr_{0.5}Fe_{0.2}O_{3-\delta}$ Catalysts with Enhanced, Electrochemical Performance by Removing Inherent Heterogeneous Surface Film Layer, Advanced Materials, 27, 266-271 (2015).

[Nonpatent document 8] M. Kakihana, M. Yoshimura, Synthesized Characteristics of Complex Multicomponent Oxides by Polymerized Complex Method, Bull. Chem. Soc. Jpn., 72, 1427-1443 (1999).

[Nonpatent document 9] http://abulafia.mtic.ac.uk/shannon/ptable.php from Shannon, Acta Crystallographica, A32, and 751-767 (1976).

DISCLOSURE OF INVENTION

Problems to be Solved by the Invention

The present invention was carried out in order to solve the subjects. It is an object of the present invention to provide a catalyst having a high catalytic activity equivalent to or higher than that of the conventional and expensive noble metal oxide catalysts, such as $RuO_2$ and $IrO_2$, for the oxygen evolution reaction, and to provide an extremely stable catalyst having a long use life under catalytic reaction conditions for the oxygen evolution reaction. Thus, it is the object of the present invention to provide a catalyst excellent in cost effectiveness for the oxygen evolution reactions.

Means for Solving the Problem

Since the catalytic action is strengthened by making rapid the reaction (proceed to the right direction) represented by the formula (VII) discussed above, the present inventors considered at first that their attention should be paid to a substance in which many active sites are contained for that purpose. Here, the active site is a place on which molecules adsorb and react.

Both the active site of an existing non-ordered type perovskite and the active site of the substance which has a crystal structure of the ordered type perovskite which the present inventors succeeded in synthesis were considered first. The crystal structure is illustrated in FIG. 3. When the compositions considered are $CaFeO_3$ (FIG. 13) and $CaCu_3Fe_4O_{12}$ (FIG. 14), regarding each particle in the left figure of FIG. 3, an A site metal is Ca, a B site metal is Fe, and other small particles are O. Similarly, regarding the particles in the right figure of FIG. 3, an A site metal is Ca, a B site metal is Fe, and other small particles are O, and an A' site metal in the right figure of FIG. 3 is Cu (there is no A' site metal in the left figure of FIG. 3).

According to the comparatively latest research, the influence of the transition metal ion of a B-site is determined to be large on the active site in the perovskite-type catalyst for the oxygen evolution reaction. That is, the substance in which many active sites mentioned above are contained is a B-site metal in this case.

Here, in FIG. 3, when a non-ordered type and an ordered-type are compared for each other, Fe of the B-site metal of the same number exists in both types. Although there are more Ca ions of the A-site metal in the non-ordered type $CaFeO_3$, there exists Cu of the A' site metal in the ordered-type $CaCu_3Fe_4O_{12}$, therefore, the grand total of Ca and Cu is the same number with Ca of the non-ordered type $CaFeO_3$. Accordingly, since the number of the active sites is the same, it is hard to consider immediately that the catalyst performance of the ordered-type $CaCu_3Fe_4O_{12}$ improves extremely than that of the non-ordered-type $CaFeO_3$.

Generation of hydroxylated Ca from the Ca of the A-site metal has been known for a long time to cover Fe, i.e., an active site, of the B-site metal and to degrade the catalytic action. Considering simply, of course in the non-ordered type $CaFeO_3$ and also in the ordered-type $CaCu_3Fe_4O_{12}$, hydroxylated Ca is similarly considered to cover Fe, i.e., the active site, it is hard to consider immediately that the catalyst performance of the ordered-type $CaCu_3Fe_4O_{12}$ improves dramatically also from this point.

Accordingly, even those skilled in the art can not readily think that the ordered-type $CaCu_3Fe_4O_{12}$ is effective as a catalyst. This is in agreement with the fact that there is no prior art describing the ordered-type perovskite to be applicable as a catalyst.

However, as a result of experiments only for making sure, and as can be seen from the compositions shown in FIG. 13 and FIG. 14, it turned out that the catalyst performance of the ordered-type $CaCu_3Fe_4O_{12}$ was superior extremely, and the catalyst performance of the non-ordered-type $CaFeO_3$ was inferior. The followings are found as a result of extensive investigation on this.

As described above, in $CaFeO_3$ in the left figure of FIG. 3, Ca of the A-site metal and Fe of the B-site metal form ionic bonding to 0, and are located in a line. On the other hand, in the ordered-type perovskite in the right figure of FIG. 3, Ca of the A-site metal is arranged alternately with Cu of the A'-site metal. Then, the bonding state of Cu of the A' site metal was investigated in detail using the synchrotron orbital radiation of SPring-8. As a result, it was discovered that Cu has an overlap of an electron orbital, i.e., a covalent bond, in addition to an ionic bond between 0. (S. Yagi, I. Yamada, H. Tsukasaki, A. Seno, M. Murakami, H. Fujii, H. Chen, N. Umezawa, H. Abe, N. Nishiyama and S. Mori, Covalency-reinforced oxygen evolution reaction catalyst (under submission)). Stability of an ionic bond is low. The ionic bond reacts with OH etc. and tends to form an amorphous state. However, since the covalent bond is hard to form an amorphous state, Cu in this case acts as an active site.

The covalent bond of Cu which is produced as a result has a structure freely spreading around within the crystal structure. Accordingly, the stability of the covalent bond of Cu is extremely high, an active site is maintained firmly and a three-dimensional all-around covalent bond network is formed. As a result, it is considered that there also exists a synergistic effect that movement of a charge becomes smooth and an electrochemical reaction becomes fast. That is, in $CaCu_3Fe_4O_{12}$, Cu in addition to Fe also acts as an active site, resulting in the increase of the active sites, and, in addition, the movement of a charge is also more rapid than in $CaFeO_3$, thus, it was clarified that $CaCu_3Fe_4O_{12}$ has a more efficient catalytic action.

When an attention is paid only to the active site, $CuFe_2O_4$ without Ca will also be apparently considered to be effective, and it will be expected to be promising as a catalyst. However, $CuFe_2O_4$ took a spinel structure, the valence of Fe was as low as trivalent, and there were actually few active sites as a result. Accordingly, its catalyst performance was not effective. Conversely, it can be said that the active sites increase and a stable and efficient catalytic effect is obtained for the first time by using a perovskite structure and using an A-site ordered perovskite specifically.

Then, the effect of the ionic radius is also considered. According to Table 1, the ionic radius of $Ca^{2+}$ of the A site is 1.34 Å, whereas the ionic radius of $Cu^{2+}$ of the A' site is 0.57 Å. Thus, since the ionic radius of Cu is small, distortion is generated and stabilization is not obtained when the arrangement of A site and A' site is irregular. However, stabilization can be obtained by standing in a line regularly. Also from this, in the perovskite of an ordered type, the A-site metal takes an alternately regular arrangement with the A' site metal and, therefore, the perovskite of the ordered type is considered to become stable chemically.

In the ordered perovskite, as shown in the right figure of FIG. 3, the position of the O atom deviates from the position of the O atom of the regular perovskite by distortion of a lattice. Thereby, a near one and a remote one can be produced in mutual spatial relationship between plural of Off which are produced from O during electrolysis. Generation of $O_2$ is considered to be fast by these near ones.

On the other hand, in the non-ordered perovskite, as shown in the left figure of FIG. 3, the O atom exists in the position of O of the regular perovskite, and the mutual distance is the same and there are no near one like in the ordered type. Thereby, in the non-ordered perovskite, generation of $O_2$ does not become rapid but Ca of the A-site metal becomes a hydroxide so as to cover the B-site metal. However, in the case of $CaCu_3Fe_4O_{12}$ of the ordered type, in addition to few portions of Ca which become a hydroxide easily, the generation of $O_2$ is still more rapid and the generation of hydroxide is suppressed. Accordingly, it is hard to make such change as to cover the B-site metal according to this synergistic effect.

As shown in FIG. 13 and FIG. 14, the catalyst performance does not deteriorate easily even if repeated use is carried out 10 times or more in $CaCu_3Fe_4O_{12}$ of the ordered type, whereas in $CaFeO_3$ of the non-ordered type, its catalyst performance degrades in proportion to the extent of the repeated use.

The reason for the catalyst performance of $CaCu_3Fe_4O_{12}$ of the ordered type improves gradually up to 10 times, as shown in FIG. 13 and FIG. 14, is considered as follows. That is, although the hydroxide of Ca is generated in early stages by energization, the generation ends after a while and priority is given to a catalytic reaction since the quantity of the hydroxide is not much. On the other hand, the reason why the catalyst performance of $CaFeO_3$ of the non-ordered type deteriorates with repeated use is considered to be because the surface is covered with hydroxide along with the repeated use. FIG. 4 represents this result.

The lattice image near the surface of the catalyst photographed for this object is shown in FIG. 4, and the inconsistency points show an amorphous phase. It was confirmed from this image that, in $CaFeO_3$, the surface has many amorphous phases, i.e., hydroxides, whereas in $CaCu_3Fe_4O_{12}$, amorphous phases are few on the surface.

Each ionic radius of an A-site metal, an A' site metal, and a B-site metal in the case of the ordered perovskite is shown in Table 1. A source is based on non-patent document 9. As shown in right figure of FIG. 3, each coordination number in the ordered perovskite is 12 for the A site, 4s for the A'-site and 6 for the B-site. The perovskite having a large difference in the radii of the A-site metal and the A' site metal is stabilized more among them, and, as a result, the catalytic action is more excellent. The ionic radius of the A-site metal ion is characterized by being larger than the ionic radius of the A' site metal ion in 0.37 Å or more.

TABLE 1

Ionic Radius for each of A site matel, A' site metal and B site metal of the ordered perovskite (from non-patent document 9)

| Site | Ion | Coordination | Ionic radius: A | Ionic radius: pm |
|---|---|---|---|---|
| A | $Ag^+$ | 8 | 1.28 | 128 |
|   | $K^+$ | 12 | 1.64 | 164 |
|   | $Na^+$ | 12 | 1.39 | 139 |
|   | $Pb^{2+}$ | 12 | 1.49 | 149 |
|   | $Sr^{2+}$ | 12 | 1.44 | 144 |
|   | $Ca^{2+}$ | 12 | 1.34 | 134 |
|   | $La^{3+}$ | 12 | 1.36 | 136 |
|   | $Pr^{3+}$ | 9 | 1.179 | 117.9 |
|   | $Bi^{3+}$ | 8 | 1.17 | 117 |
|   | $Nd^{3+}$ | 12 | 1.27 | 127 |
|   | $Sm^{3+}$ | 12 | 1.24 | 124 |
|   | $Eu^{3+}$ | 10 | 1.35 | 135 |
|   | $Gd^{3+}$ | 9 | 1.107 | 110.7 |
|   | $Tb^{3+}$ | 9 | 1.095 | 109.5 |
|   | $Dy^{3+}$ | 9 | 1.083 | 108.3 |
|   | $Ho^{3+}$ | 10 | 1.12 | 112 |
|   | $Y^{3+}$ | 9 | 1.075 | 107.5 |
|   | $Er^{3+}$ | 9 | 1.062 | 106.2 |
|   | $Tm^{3+}$ | 9 | 1.052 | 105.2 |
|   | $Yb^{3+}$ | 9 | 1.042 | 104.2 |
|   | $Lu^{3+}$ | 9 | 1.032 | 103.2 |
|   | $Ce^{4+}$ | 12 | 1.14 | 114 |
| A' | $Mn^{2+}$ | 4 | 0.66 | 66 |
|   | $Mn^{3+}$ | 6 | 0.645 | 64.5 |
|   | $Pd^{2+}$ | 4 sequare planar | 0.64 | 64 |
|   | $Fe^{2+}$ | 4 sequare planar | 0.64 | 64 |
|   | $Co^{2+}$ | 4 | 0.58 | 58 |
|   | $Cu^{2+}$ | 4 sequare planar | 0.57 | 57 |
| B | $Ti^{4+}$ | 6 | 0.74 | 74 |
|   | $Sn^{4+}$ | 6 | 0.69 | 69 |
|   | $Mn^{3+}$ | 6 | 0.645 | 64.5 |
|   | $Tr^{4+}$ | 6 | 0.625 | 62.5 |
|   | $Pt^{4+}$ | 6 | 0.625 | 62.5 |
|   | $Ru^{4+}$ | 6 | 0.62 | 62 |
|   | $Ga^{3+}$ | 6 | 0.62 | 62 |
|   | $Co^{3+}$ | 6 | 0.61 | 61 |
|   | $Rh^{4+}$ | 6 | 0.6 | 60 |
|   | $Sb^{5+}$ | 6 | 0.6 | 60 |
|   | $Fe^{4+}$ | 6 | 0.585 | 58.5 |
|   | $V^{4+}$ | 6 | 0.58 | 58 |
|   | $Re^{5+}$ | 6 | 0.58 | 58 |
|   | $Cr^{4+}$ | 6 | 0.55 | 55 |
|   | $Al^{3+}$ | 6 | 0.535 | 53.5 |
|   | $Mn^{4+}$ | 6 | 0.53 | 53 |
|   | $Ge^{4+}$ | 6 | 0.53 | 53 |

As mentioned above, the ordered perovskite exhibits the excellent catalyst performance from the reasons that the active site is formed by the covalent bond of the A'-site, it makes easy for $O_2$ to be generated, and it makes difficult for Ca hydroxide to be formed. These results are the extremely important findings discovered by the present inventors for the first time. As a result of further repeated researches in accordance with this view, the ordered perovskite having the excellent catalyst performances shown in the followings was discovered, and the present invention was completed.

That is, the present invention made in order to achieve the above object is: [1] A catalyst for an oxygen evolution reaction comprising an A-site ordered perovskite oxide.

The present invention is: [2] The catalyst for the oxygen evolution reaction according to [1], wherein the A-site ordered perovskite oxide is represented by the chemical formula (1): $AA'_3B_4O_{12}$, wherein, A represents at least one metallic element selected from the group consisting of Na, K, Ca, Sr, Ba, Ag, Pb, Bi, Y, La, Ce, Pr, Nd, Sm, Eu, Gd, Tb, Dy, Ho, Er, Tm, Yb and Lu, A' represents at least one transition metal element selected from the group consisting of Cu, Mn, Fe, Co and Pd, and forms a covalent bond, and B represents at least one metallic element selected from the group consisting of Ti, V, Cr, Mn, Fe, Co, Ru, Rh, Re, Ir, Pt, Al, Ga, Ge, Sn and Sb.

Furthermore, the present invention is: [3] The catalyst for the oxygen evolution reaction according to [2], wherein an ionic radius of the A-site metal ion is equal to or 0.37 Å larger than an ionic radius of the A'-site metal ion in the A-site ordered perovskite.

Furthermore, the present invention is [4]: The catalyst for the oxygen evolution reaction according to any one of [1]-[3], wherein, the A-site ordered perovskite oxide is an A-site ordered perovskite oxide represented by the chemical formula (2): $A^{I}Cu_3Fe_4O_{12}$, wherein $A^{I}$ represents at least one metallic element selected from the group consisting of Ca, Sr, Y, La, and Ce, and this Cu has a covalent bond.

Furthermore, the present invention is: [5] The catalyst for the oxygen evolution reaction according to any one of [1]-[3], wherein the A-site ordered perovskite oxide is an A-site ordered perovskite oxide represented by the chemical formula (3): $CaCu_3B^{I}_4O_{12}$, wherein Cu has a covalent bond and $B^{I}$ is at least one transition metal element selected from the group consisting of Ti, Mn, Fe, and Ru.

Furthermore, the present invention is: [6] The present invention is the catalyst for the oxygen evolution reaction according to any one of [1]-[5], wherein the A-site ordered perovskite oxide is an A-site ordered perovskite oxide represented by the chemical formula (4): $CaCu_3Fe_4O_{12}$, and has a covalent bond.

Furthermore, the present invention is: [7] The catalyst for the oxygen evolution reaction according to any one of [1]-[3], wherein the A-site ordered perovskite oxide is an A-site ordered perovskite oxide represented by the chemical formula (5): $A^{II}Cu_3B^{II}_4O_{12}$ or the chemical formula (6): $A^{II}Mn_3B^{II}_4O^{12}$, wherein $A^{II}$ represents at least one metallic element selected from the group consisting of Ca, La, Pr, Nd, Sm, Eu, Gd, Tb, Dy, Ho, Er, Tm, Yb, and Lu, and $B^{II}$ represents Ti, Mn, Ru, or $(Fe_{0.5}+Sb_{0.5})$.

Furthermore, the present invention is: [8] The catalyst for the oxygen evolution reaction according to [7], wherein the A-site ordered perovskite oxide represented by the chemical formula (5) is $CaCu_3Ti_4O_{12}$, $CaCu_3Ru_4O_{12}$, $CaCu_3(Fe_2Sb_2)O_{12}$, or $CaCu_3(Fe_2Re_2)O_{12}$, or the A-site ordered perovskite oxide represented by the chemical formula (6) is $CaMn_3Mn_4O_{12}$.

Furthermore, the present invention is: [9] The catalyst for the oxygen evolution reaction according to any one of [1]-[7], wherein the A-site ordered perovskite oxide is produced by a high pressure synthetic process of 1 GPa-20 GPa.

Furthermore, the present invention is: [10] The catalyst for the oxygen evolution reaction according to [8], wherein the A-site ordered perovskite oxide is produced by an ordinary pressure synthetic process.

Furthermore, the present invention is: [11] The catalyst for the oxygen evolution reaction according to any one of [1]-[10], wherein the oxygen evolution reaction is the oxygen evolution reaction in a metal-air battery and in a direct water decomposition.

Furthermore, the present invention is: [12] A method for the oxygen evolution reaction using the catalyst for the oxygen evolution reaction according to any one of [1]-[11].

Furthermore, the present invention is: [13] A catalyst composition for the oxygen evolution reaction comprising the catalyst for the oxygen evolution reaction according to any one of [1]-[11] and a carrier.

Effects of Invention

In comparison with expensive noble metal oxide catalysts, such as $RuO_2$ and $IrO_2$ as catalysts for the oxygen evolution reactions from the past, the A-site ordered perovskite oxide catalyst of the present invention has a higher catalytic activity more than those of a noble metal catalyst, and is extremely stable under catalytic reaction conditions, and has a long life of repetition use. As a result, it is a catalyst with high practical use excellent in cost effectiveness. The present invention also provides a composition comprising the catalyst excellent in the cost effectiveness. The present invention provides a method for oxygen evolution reaction using the catalyst which is excellent in the cost effectiveness, and also provides a method for oxygen evolution reaction with the sufficient efficiency in a metal-air battery and in a direct water decomposition.

EMBODIMENT FOR CARRYING OUT INVENTION

Hereinafter, although the embodiments for carrying out the present invention are explained in detail, the scope of the present invention is not limited to these embodiments.

<A-Site Ordered Perovskite Oxide Used as a Catalyst by the Present Invention>

The details of the A-site ordered perovskite oxide used as a catalyst by the present invention are described as follows.

Figure 3:
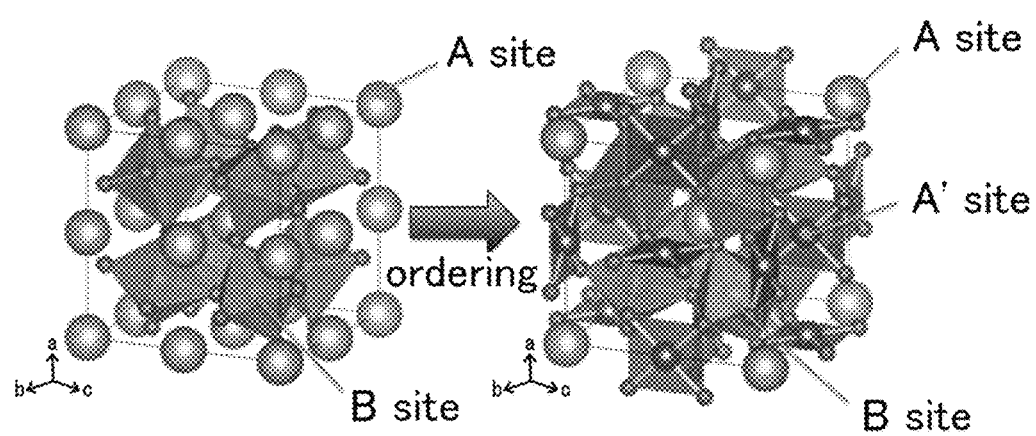
FIG. 3 shows a comparison of crystal structures between the A-site ordered perovskite oxide $AA'_3B_4O_{12}$ (right) to which the present invention is applied, and a simple perovskite oxide $ABO_3$ (left).
Figure 4:
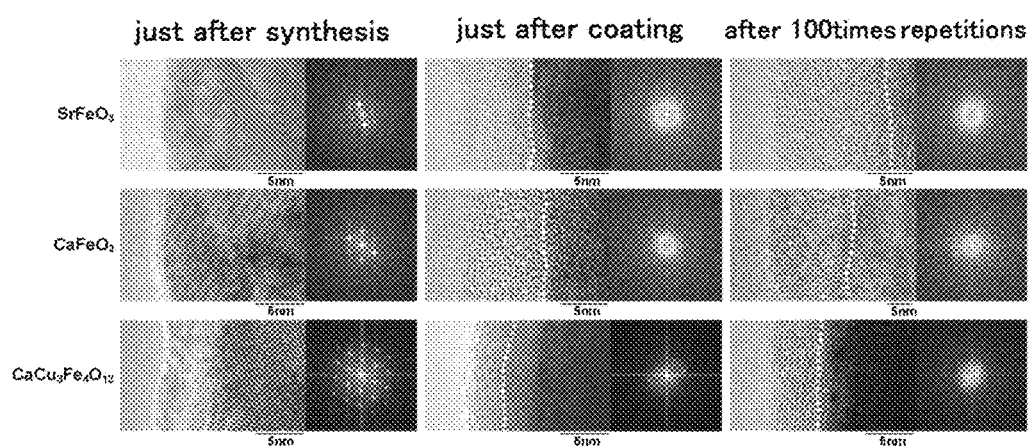
FIG. 4 shows the HRTEM image (High Resolution Transmission Electron Microscope image) and the FFT image (Fast Fourier Transform image) of immediately after synthesis, immediately after application, and after 100 times OER measurements of $SrFeO_3$, $CaFeO_3$, and $CaCu_3Fe_4O_{12}$. The boundary of a crystalline region and an amorphous region is shown by the dashed line. All the FFT images are obtained in the surface about 10×10 nm$^2$ region.

The A-site ordered perovskite oxide used by the present invention has a simple perovskite structure. That is, the A-site ordered perovskite oxide is an oxide in which A-sites are organized so that a metallic element A occupies one fourth of A sites of the chemical formula $ABO_4$ in the left figure of FIG. 3 and a transition metal element A' occupies the residual three fourths (Chemical formula (1): $AA'_3B_4O_{12}$ in the right figure of FIG. 3). A in the chemical formula (1) represents at least one metal element selected from the group consisting of Na, K, Ca, Sr, Ba, Ag, Pb, Bi, Y, La, Ce, Pr, Nd, Sm, Eu, Gd, Tb, Dy, Ho, Er, Tm, Yb and Lu, A' represents at least one transition metal element selected from the group consisting of Cu, Mn, Fe, Co and Pd, and forms a covalent bond, and B represents at least one metallic element selected from the group consisting of Ti, V, Cr, Mn, Fe, Co, Ru, Rh, Re, Ir, Pt, Al, Ga, Ge, Sn and Sb. Here, it is one of the features as mentioned above that Cu of the A' site metal has overlap of an electron orbital, i.e., a covalent bond, in addition to an ionic bond with O. Although the ionic bond reacts with OH etc. and is easily made amorphous since its stability is low. However, since the covalent bond tends to be difficult to become amorphous, it is considered that Cu in this case can act as a stable active site. As a result, since the covalent bond of Cu has a structure spreading around freely within the crystal structure, it becomes extremely stable, and the active site is maintained firmly. It is considered that there also exists a synergistic effect that movement of a charge becomes smooth by an all-around covalent bond network in three dimensions, and an electrochemical reaction becomes fast for its reason.

In the chemical formula (1), the CuFe family A-site ordered perovskite oxide represented by the chemical formula (2): $A^I Cu_3 Fe_4 O_{12}$ (wherein $A^I$ represents at least one metallic element selected from the group consisting of Ca, Sr, Y, La and Ce) is preferably used in terms of oxygen-evolution catalyst efficiency. As mentioned above, in $A^I Cu_3 Fe_4 O_{12}$, Cu also acts as an active site in addition to Fe, therefore, there are more active sites than $CaFeO_3$, and the movement of the charge is also rapid. Accordingly, $A^I Cu_3 Fe_4 O_{12}$ is considered to exhibit a more efficient catalytic action, and is preferably used in terms of cost effectiveness also because it does not contain a rare metal such as Pt and Ir.

In the chemical formula (1), the A-site ordered perovskite oxide represented by the chemical formula (3): $CaCu_3 B^I{}_4 O_{12}$ (wherein, Cu has a covalent bond and $B^I$ represents at least one transition metal element selected from the group consisting of Ti, Mn, Fe and Ru.) has many active sites as mentioned above because of the covalent bond property of Cu, and the movement of a charge is also rapid. Accordingly, it is preferably used in terms of oxygen evolution catalyst efficiency. It is preferably used in terms of cost effectiveness also at the point which does not contain a rare metal such as Pt and Ir.

In the chemical formula (1) or (2), the A-site ordered perovskite oxide represented by the chemical formula (4): $CaCu_3 Fe_4 O_{12}$ has a covalent bonding Cu and many active sites as mentioned above because of the covalent bond property of Cu. In addition, the movement of a charge is also rapid. Accordingly, it is preferably used in terms of an oxygen evolution catalyst efficiency. It is preferably used in terms of cost effectiveness also at the point that it does not contain a rare metal such as Pt and Ir.

In the chemical formula (1), the A-site ordered perovskite oxide represented by the chemical formula (5): $A^{II} Cu_3 B^{II}{}_4 O_{12}$, or the chemical formula (6): $A^{II} Mn_3 B^{II}{}_4 O_{12}$ (wherein, $A^{II}$ represents at least one metallic element selected from the group consisting of Ca, La, Pr, Nd, Sm, Eu, Gd, Tb, Dy, Ho, Er, Tm, Yb and Lu, and B" represents Ti, Mn, Ru, or $(Fe_{0.5}+Sb_{0.5}))$ is preferably used in that it has a high oxygen evolution catalytic efficiency uniformly. It is preferably used in terms of cost effectiveness also at the point that it does not contain a rare metal, such as Pt and Ir.

In the chemical formula (5), at least one A-site ordered perovskite oxide selected from the group consisting of $CaCu_3 Mn_4 O_{12}$, $CaCu_3 Ti_4 O_{12}$, $CaCu_3 Ru_4 O_{12}$, $CaCu_3 (Fe_2 Sb_2) O_{12}$ and $CaCu_3 (Fe_2 Re_2) O_{12}$, or in the chemical formula (6), the A-site ordered perovskite oxide of $CaMn_3 Mn_4 O_{12}$ (it is of the same meaning with $CaMn_7 O_{12}$) is preferably used in that it has a high oxygen evolution catalyst efficiency uniformly. It is preferably used in terms of cost effectiveness also at the point that it does not contain a rare metal, such as Pt and Ir.

In the above-mentioned A-site ordered perovskite used by the present invention, the ionic radius of the A-site metal ion is characterized by being larger than the ionic radius of A' site metal ion 0.37 Å or more. In the A-site ordered perovskite oxide $CaCu_3 Fe_4 O_{12}$ used in the present invention, for example, the ionic radius of $Ca^{2+}$ of the A site is 1.34 Å, and that of $Cu^{2+}$ of the A' site is 0.57 Å. Since the ionic radius of Cu is small, if the A site and the A' site take an irregular sequence, distortion will be generated and it will not be stabilized. However, it is stabilized by being regularly arranged. Also from this, in the perovskite of the ordered type, the A-site metal and the A' site metal take alternately regular arrangement, therefore they are considered to become stable chemically. In the A-site ordered perovskite, as shown in the right figure of FIG. 3, the position of O atom has shifted from the position of O of a regular perovskite by distortion of a lattice. Thereby, near ones and remote ones are mutually produced for the spatial relationship of $OH^-$ which are produced during an electrolysis at O. The development of $O_2$ is considered to be fast by these near ones.

The form, size, etc. of the A-site ordered perovskite oxide catalyst are not limited in particular. They should just be suitably set up corresponding to the target parts etc. From viewpoints of the processing simplicity of parts, etc., particulates are desirable. When the above-mentioned perovskite type oxide is particulates, about 1-1000 μm of mean particle diameter are desirable. What is necessary is just to adopt a well-known method as the measuring method of the mean particle diameter. For example, a transmission electron microscope method (abbreviated as "TEM"), a scanning electron microscope method (abbreviated as "SEM"), etc. are mentioned.

A crystal structure of the A-site ordered perovskite oxide catalyst can be confirmed by an X-ray diffraction method (abbreviated as "XRD"), Mossbauer spectroscopy, etc., for example.

<Production Method of the A-Site Ordered Perovskite Oxide>

The A-site ordered perovskite oxide catalyst (chemical formula (1): $AA'_3 B_4 O_{12}$) can usually be produced by carrying out heat treatment (calcination) under high temperature and high pressure (a high-pressure solid-phase-synthesis method) after mixing oxides of A, oxides of A', and oxides of B, for example. On the other hand, specific A-site ordered perovskite oxide, such as $CaCu_3 Ti_4 O_{12}$, $CaCu_3 Ru_4 O_{12}$, $CaCu_3 (Fe_2 Sb_2) O_{12}$, and $CaMn_3 Mn_4 O_{12}$, can be also produced by an ordinary pressure synthetic process.

Since the solid-phase-synthesis method is a chemical reaction between solids, a rate of reaction becomes markedly slow compared with a liquid phase process etc. It is because diffusion of oxide powder particles serves as a rate-determining step. In order to conquer this problem, it is required to make size of particles as small as possible using a ball mill etc.

The blending ratio of the oxide of A, the oxide of A', and the oxide of B is not limited, in particular, and for example, what is necessary is just to set up suitably so that the A-site ordered perovskite oxide shown by the chemical formula (1) $(AA'_3 B_4 O_{12})$ may be obtained. For example, when the A-site ordered perovskite oxide of $CaCu_3 Fe_4 O_{12}$ is produced, the perovskite type oxide catalyst used by the present invention is suitably obtained by using CaO, CuO, and $Fe_2 O_3$ in a ratio of 1:3:2 by a molar ratio.

Figure 6:
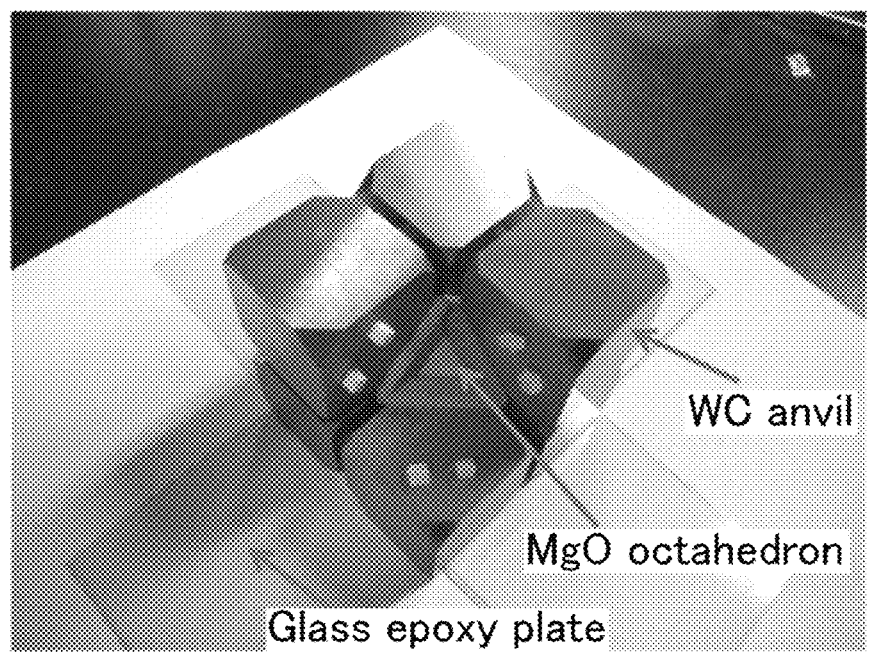
FIG. 6 shows the cell constructed by the tungsten carbide (WC) super hard anvil of the high pressure synthesizer unit (Kawai type high pressure synthesizer unit, for example) used by the present invention. MgO octahedron is a hydraulic medium. The sample part containing oxide powders of raw materials is put in this cell, and the cell is pressurized to about 1-20 GPa, heated at 700-1000° C., and kept for tens of minutes.

The above-mentioned heat treatment can be performed in accordance with a well-known method. For example, after filling up a platinum capsule with the mixture of the oxide of A, the oxide of A', and the oxide of B, the obtained capsule is pressurized and heated using high-pressure synthesis equipment, when high pressure is required. However, in the case of the oxide in which ordinary pressure synthesis is possible (refer to the above), a pressure device is not required although there are few examples. As a well-known pressure device, the DIA type high-pressure generation system which is a multi-anvil equipment which can generate a high-pressure up to about 10 GPa is exemplified. The Kawai type equipment is further exemplified in which the high-pressure development of 25-50 GPa is possible by pressurizing successively through putting in a second more step of an anvil. The pressures during heat-treating the mixture of each oxide shown in FIG. 6 are 0.1-50 GPa, preferably 0.5-40 GPa, more preferably 1-20 GPa, for example, 10-18 GPa. About 700° C. or more of the heat treatment temperature is desirable, and about 1000-1200° C. is more desirable. The A-site ordered perovskite oxide catalyst used by the present invention is suitably obtained by especially carrying out at the pressure of about 10 or more GPa (for example, 15 GPa), and the temperature of 1000° C. or more (for example, 1200° C.).

Heat treatment time may be suitably adjusted corresponding to heat treatment conditions, such as heat treatment temperature, so that raw materials may fully react, and it is usually for about several minutes to 120 minutes, preferably for 10 minutes to 60 minutes, for example, for 20 minutes to 40 minutes.

The above-mentioned mixture may contain well-known additives in advance of the above-mentioned heat treatment. As well-known additives, oxidizing agents, such as $KClO_4$, are mentioned, for example.

On the other hand, methods for avoiding diffusion problems of solid powder include a citric acid complex polymerizing method. A precursor which is a multiple oxide is synthesized in the state of a homogeneous reaction by this citric acid complex polymerizing method, and the precursor powder which has enabled mixing in atomic levels is obtained. This method is a method of producing the target A-site ordered perovskite oxide catalyst by carrying out a high-pressure high-temperature treatment of the powder.

More specifically, at first, a metal salt is dissolved and a metal hydroxy carboxylic acid complex is made to form in the solution of glycol (ethylene glycol, propylene glycol, etc.) which contains hydroxy carboxylic acid, such as citric acid, excessively. This solution is heated at a temperature of about 120-150° C., an esterification reaction is generated continuously, and a polyester polymer gel is obtained. Since metal ions are distributed uniformly in this gel, the segregation level of metallic elements is suppressed low. High grade multiple oxide precursors can be obtained by carrying out the pyrolysis of this at about 400° C. (refer to non-patent document 8). By calcining multiple oxide precursors at a high-pressure high-temperature condition, the A-site ordered perovskite oxide catalyst can be obtained. During calcination, a pressure is usually 1-20 GPa, and calcination temperature is usually 600-1,000° C., preferably 700-900° C., for example, 850° C.

In addition, the A-site ordered perovskite type oxides which can be synthesized in ordinary pressure conditions by the application of this citric acid complex polymerizing method as above-mentioned are not many, and $CaCu_3Ti_4O_{12}$, $CaCu_3Ru_4O_{12}$, $CaCu_3(Fe_2Sb_2)O_{12}$ and $CaMn_3Mn_4O_{12}$ are exemplified.

<Air Electrode Catalyst Layer>

In the present invention, the A-site ordered perovskite oxide is used for an oxygen generating electrode layer of a battery as a catalyst. The air electrode catalyst layer is a layer which contains an air electrode catalyst and an electrolyte for the air electrode preferably. The air electrode catalyst layer may contain a binding material further if needed.

The air electrode catalyst for metal air batteries regarding the present invention excels the conventional air electrode catalyst in oxidation resistance, and even if exposed under a severe oxidizing atmosphere, it has such a feature as being hard to receive deterioration. From a viewpoint that an electrode reaction is performed more smoothly, the air electrode catalyst is desirable to be supported on a conductive material. What is necessary is just to have conductivity as a conductive material used for an air electrode catalyst layer, and it is not limited especially. For example, a carbon material, a perovskite type conductive material, a porous conductive polymer, a metal porous body, etc. can be mentioned. A carbon material may have porous structure and may not have porous structure. As a carbon material which has porous structure, meso-porous carbon etc. can specifically be mentioned. On the other hand, as a carbon material which does not have porous structure, graphite, acetylene black, a carbon nanotube, a carbon fiber, etc. can specifically be mentioned.

<Rotating Ring Disk Catalyst Electrode>

In the present invention, the production method of the catalyst electrode for rotating ring disks used for measurement of the catalyst electrode characteristics is not limited, in particular. As an example, an illustrative procedure is shown below.

Figure 7:
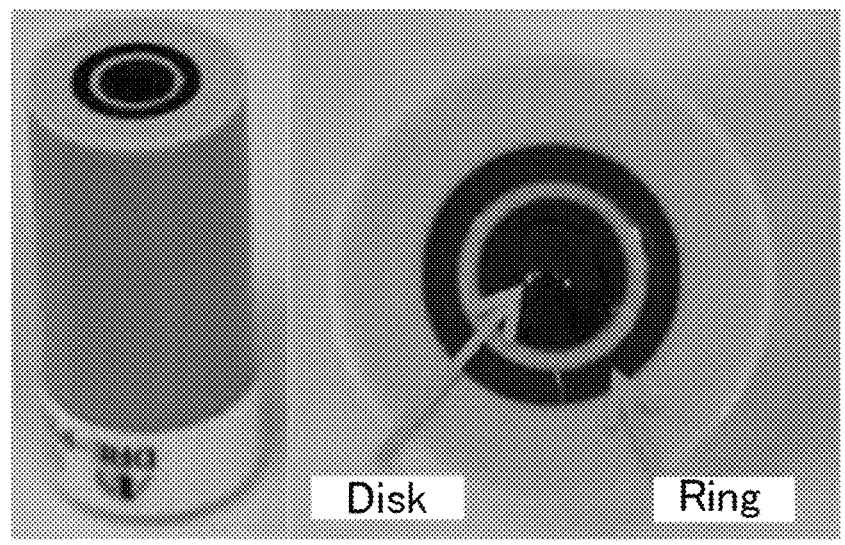
FIG. 7 shows a rotating ring disk electrode used by the present invention.
Figure 8:
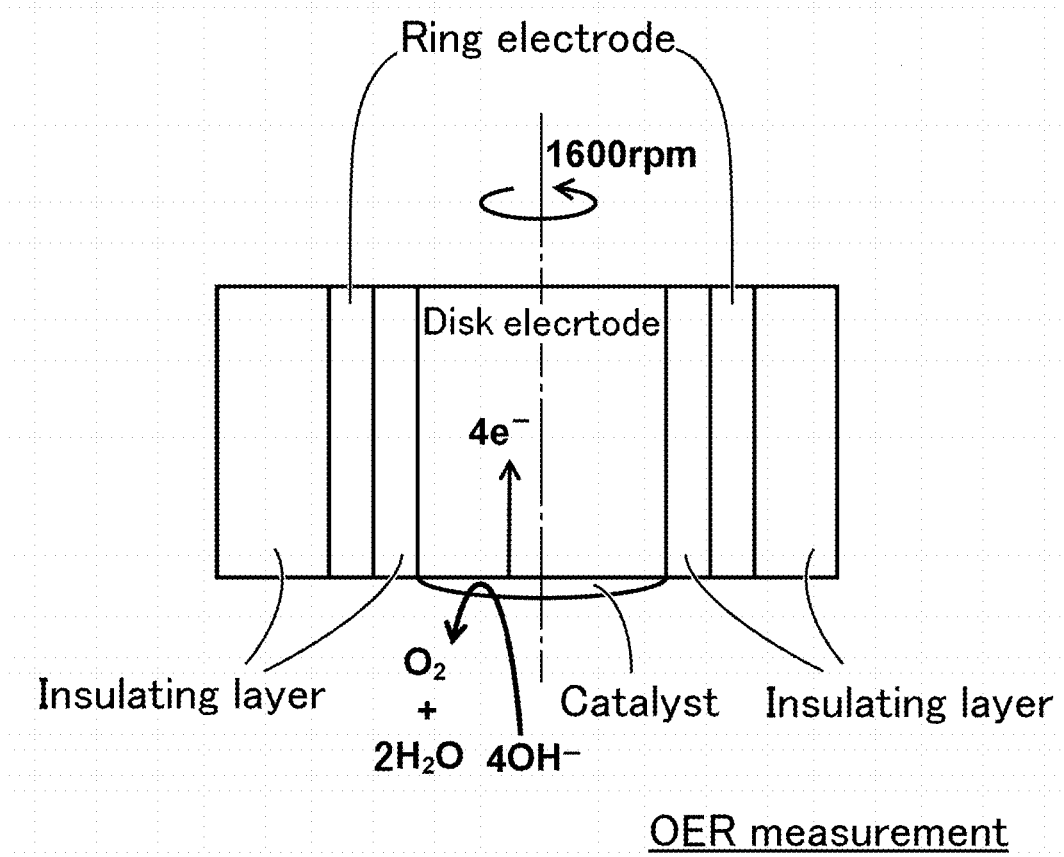
FIG. 8 shows a mechanism of OER measurement using a rotating ring disk electrode used by the present invention.

That is, a catalyst ink is produced by mixing and agitating an A-site ordered perovskite oxide powder as an oxygen generating catalyst, acetylene black as a conductive material, Nafion™ dispersion liquid being ion-exchanged with a $K^+$ ion as a fixed binder which does not prevent movement to the catalyst surface of dissolved oxygen, and tetrahydrofuran as a dispersion medium. After carrying out ultrasonic stirring of the obtained catalyst ink, it is dropped on the glassy carbon disk of a disk part, and after that, at a room temperature, it is dried in vacuum overnight, and the catalyst electrode for measurement is obtained (refer to FIGS. 7 and 8.).

The Nafion™ dispersing element which is ion-exchanged with 3.33 wt % of $K^+$ ion is specifically prepared by mixing 5 wt % of a proton type Nafion™ dispersing element and a 0.1 M-KOH aqueous solution in volume ratio of 2:1. The catalyst ink of the A-site ordered perovskite oxide is prepared by mixing 50 mg of oxides concerned, 10 mg of acetylene black (AB), and 0.3 ml of 3.33 wt % $K^+$ ion exchanged Nafion™ dispersing body. By adding tetrahydrofuran, the volume of the ink is adjusted to 10 ml. After the rotating ring disk electrode consisting of a glassy carbon disk of 0.4 cm in diameter and a Pt ring of outside diameter of 0.7 cm and 0.5 cm in inside diameter is ground by an alumina slurry of 0.05 μm, this rotating ring disk electrode is used as a working electrode. The catalyst ink of 6.4 μ-liter is dropped and developed on the glassy carbon (GC) electrode portion ($0.2 \times 0.2 \times \pi cm^2$). The catalyst layer on glassy carbon has the following composition after vacuum dried at a room temperature overnight: 0.25 mg-oxide $cm^{-2}$-disk, 0.05 mg-AB $cm^{-2}$-disk, and 0.005 mg-Nafion $cm^{-2}$-disk.

<Measurement of the Electrochemical Characteristic of the OER Catalyst>

The electrochemical characteristic of the OER catalyst is measured in the following procedures using the catalyst electrode obtained above. The glassy carbon electrode supporting the catalyst is dipped in the electrolyte (for example, a KOH solution) saturated with oxygen, sweep is carried out up to predetermined electric potential (for example, to 0.3-0.9 V vs. Hg/HgO) using the rotating ring disk device equipped with a bipotentiostat with a predetermined electric potential sweep rate (for example, 10 mV/sec), then, the sweep is carried out up to initial electric potential with the same electric potential sweep rate (to 0.9-0.3 V vs. Hg/HgO), and the current density (OER current-potential curve) during the period is measured (refer to FIG. 1.). The measurement is carried out by using Pt wire electrode as a counter electrode, and the Hg/HgO electrode filled with a 0.10 M-KOH aqueous solution as a reference electrode. The relation of 0 V vs. Hg/HgO=+0.926 V vs. RHE exists between the electric potential of a Hg/HgO electrode basis and the electric potential of a reversible hydrogen electrode (RHE: Reversible Hydrogen Electrode) basis, and this relationship always holds whenever the pH values of an electrolyte and the internal liquid of the Hg/HgO electrode are the same. All measurements are performed at a room temperature under a saturated oxygen, and the measurements are carried out by fixing the reversible electrode potential of an $O_2/H_2O$ redox couple to 0.304 V vs. Hg/HgO (1.23 V vs. RHE). For the catalyst characterization of the perovskite oxide to the OER reaction, the electric potential of the glassy carbon portion modified with the catalyst is controlled by 0.3 to 0.9 V vs. Hg/HgO (1.23 to 1.83 V vs. RHE) at the electric potential sweep rate of 10 mVs$^{-1}$. In the following working examples, all the OER electric current are shown as a relative electric current value per presumed surface area of the perovskite oxide catalyst, and electric potential rectifies iR drops by the resistance component of the electrolyte (it is decided by the alternating-current-impedance method that the iR drops will be about 43 ohms), and is shown as the electric potential (E-iR/V vs. RHE) of the RHE basis. In addition, it may be displayed as relative electric current values per oxide catalyst weight for comparison.

The OER reaction on the disk in an alkaline aqueous solution proceeds along the following reaction formula (7): $4OH^- \rightarrow O_2 + 2H_2O + 4e^-$ (7) (refer to FIG. 8.).

<Evaluation Index of OER Catalyst Performance>

An evaluation index of catalyst performance will be explained below using a current-potential curve obtained by sweeping of an electric potential. For promoting OER of the above (7) on a catalyst surface, it is necessary to apply a voltage for the energy accompanying oxygen generation. This voltage is kept constant by the pH of a solution. On the other hand, it is necessary to apply excessively the voltage for the activation energy of the oxygen evolution reaction further. This is called overvoltage, and the OER catalyst performance will be excellent when the overvoltage is low (that is, when rising of the electric current is at a low electric potential). In addition, the OER catalyst performance will be excellent, when rising of the electric current is steep (that is, when increase in the electric current value to predetermined electric potential (electric current gradient) is high). Therefore, in the current-potential curve, both overvoltage value and gradient of a current-potential curve become an evaluation index of the OER catalyst performance.

EXAMPLES

The present invention is explained specifically by the following examples. However, the scope of the present invention is not limited to these examples.

Example 1 of Catalyst Preparation

Preparation of A-Site Ordered Perovskite Oxide Catalyst $CaCu_3Fe_4O_{12}$ (1) Preparation of a Precursor by the Citric Acid Complex Polymerizing Method:

First, a precursor mixed oxide of $CaCu_3Fe_4O_{12}$ was prepared in the following procedures by the citric acid complex polymerizing method. That is, each raw material is prepared so as the molar ratio is set to $CaCO_3:Cu(NO_3)_2\cdot 3H_2O:Fe(NO_3)_3\cdot 9H_2O$:Citric acid=1:3:4:40. An evaporating dish was set on a magnet stirrer having a hot plate, a magnet for stirring was put in, and 5 ml of distilled water was added. Subsequently, 0.775 g $CaCO_3$ (from Wako Pure Chem Co.) was added, and mixing-stirring was started. 2 ml of nitric acid was added thereto to dissolve $CaCO_3$, then 0.561 g $Cu(NO_3)_2\cdot 3H_2O$ (from Wako Pure Chem Co.), 1.25 g $Fe(NO_3)_3\cdot 9H_2O$ (from Wako Pure Chem Co.) and 5.95 g of anhydrous citric acid (from Wako Pure Chem Co.) were added, and stirring was continued, then, they were heated a little for dissolving all. Subsequently, 2 ml of ethylene glycol was added, and the mixture was heated to such an extent that it did not boil. The temperature of the solution was checked with an infrared thermometer (AD-5611A). When the temperature of the solution becomes near 90° C., brown $NO_2$ will be emitted. Since the viscosity of the solution begins to rise gradually after discharge of $NO_2$ finishes, the magnet is taken out, and heating is continued until the solution is dried up. After drying-up, high temperature treatment for 1 hour was performed by an electric furnace at 400° C., and the organic substance contained in a polymer complex was decomposed and removed to some extent, then, the precursor was obtained. This precursor was mixed by an agate mortar, and it was put into an alumina crucible, and, after high temperature treatment for 12 hours at 675° C., the precursor 0.3 g from which the organic substances etc. were removed completely was obtained.

Figure 5:
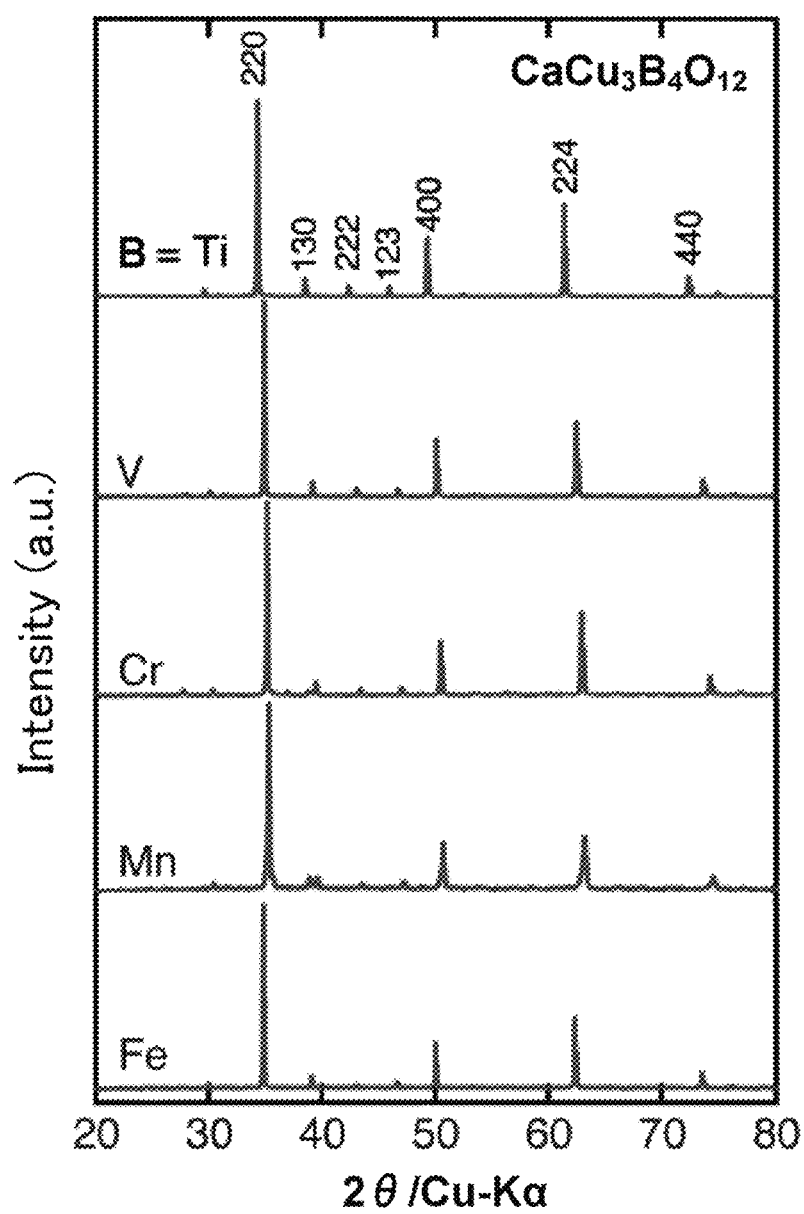
FIG. 5 is a powder X-ray diffraction pattern corresponding to each of the A-site ordered perovskite oxides $CaCu_3B_4O_{12}$ (B=Fe, Mn, Cr, V, or Ti) to which the present invention is applied (Cu-Kα). It is confirmed that these A-site ordered perovskite oxides have a single phase without mixing of impurity.

(2) Manufacture of the A-Site Ordered Perovskite Oxide Catalyst by the High-Pressure Synthetic Process Next, the A-site ordered perovskite oxide catalyst was produced as follows from the precursor produced above using the Kawai type high-pressure synthesis device. In the cell (MgO octahedron (one side is 10 mm) is a pressure-transmitting-medium body) constructed by the tungsten carbide (WC) super hard metal anvil shown in FIG. 6, a sample section was filled up with the precursor oxide powder 0.0285 g obtained above (1) and $KClO_4$ 0.0040 g (from Wako Pure Chem Co.), and the state was maintained for 30 minutes at 15 GPa and 1000° C. Subsequently, it was quenched to near room temperature in several seconds by intercepting a heating power (quenching). Then, over about 12 hours, the pressure was lowered gradually and it was returned to ordinary pressure. The product (A-site ordered perovskite oxide) in high pressure can be frozen as a metastable phase by this quench operation. By carrying out the powder X-ray diffraction measurement (Ultima IV by Rigaku Inc.: with Cu-Kα ray irradiation) of the obtained product, it was confirmed that the product was $CaCu_3Fe_4O_{12}$ of the A-site ordered perovskite oxide structure (refer to FIG. 5.). The specific surface area computed based on the particle size distribution from the scanning electron microscope (SEM) image of this thing was 0.32 m$^2$g$^{-1}$, and the specific surface area measured by the BET adsorption process was 0.45 m$^2$g$^{-1}$.

Example 2 of Catalyst Preparation

Preparation of A-Site Ordered Perovskite Oxide Catalyst $CaCu_3Mn_4O_{12}$ (1) Preparation of the A-Site Ordered Perovskite Oxide Catalyst by High-Pressure Synthetic Process The A-site ordered perovskite oxide was produced according to the example 1 (2) of catalyst preparation by using the Kawai type high-pressure synthesis device after CaO, CuO, and $MnO_2$ (both from Wako Pure Chem Co.)

were mixed so that they become a molar ratio of 1:3:4. Synthetic conditions were for 30 minutes at 12 GPa and 1000° C. According to the powder X-ray diffraction of the obtained product, it was confirmed that the product was $CaCu_3Mn_4O_{12}$ of the A-site ordered perovskite oxide structure (refer to FIG. 5.). The specific surface area computed based on the particle size distribution from the scanning electron microscope (SEM) image of this product was 0.42 $m^2g^{-1}$.

Example 3 of Catalyst Preparation

Preparation of A-Site Ordered Perovskite Oxide Catalysts $CaCu_3B_4O_{12}$ (B=Ti or Ru)

(1) Preparation of the A-Site Ordered Perovskite Oxide Catalyst by an Ordinary-Pressure Synthetic Process $CaCO_3$, CuO, and $BO_2$ (B=Ti or Ru) (both from Wako Pure Chem Co.) were mixed so that it becomes a molar ratio of 1:3:4, and the A-site ordered perovskite oxide catalyst was produced by an ordinary pressure and high-temperature synthesis method. Synthetic conditions were for 15 hours in air and at 1000° C. According to the powder X-ray diffraction (XRD) of the obtained products, it was confirmed that the products were $CaCu_3Ti_4O_{12}$ and $CaCu_3Ru_4O_{12}$ of the A-site ordered perovskite oxide structure, respectively (the XRD profile of B=Ti was shown in FIG. 5.). The specific surface areas computed based on the particle size distribution from the scanning electron microscope (SEM) image of these products were 0.24 $m^2g^{-1}$ (B=Ti) and 0.12 $m^2g^{-1}$ (B=Ru), respectively.

Example 4 of Catalyst Preparation

Figure 17:
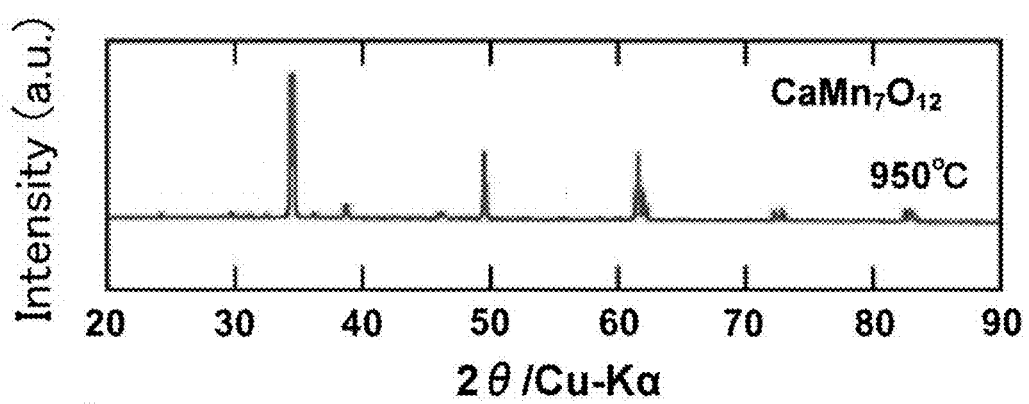
FIG. 17 shows a powder X-ray diffraction pattern (Cu-Kα) of the A-site ordered perovskite oxide catalyst $CaMn_3Mn_4O_{12}$ (it is of the same meaning with $CaMn_7O_{12}$) to which the present invention is applied. Here, 950° C. is a synthesizing temperature of the oxide catalyst.

Preparation of the A-Site Ordered Perovskite Oxide Catalyst $CaMn_7O_{12}$ (1) Preparation of the Precursor by the Citric Acid Complex Polymerizing Method According to the citric acid complex polymerizing method of the example 1 (1) of catalyst preparation, a precursor oxide was obtained from a mixture of $CaCO_3$: $Mn(NO_3)_2$: citric acid=1:7:40 (molar ratio).
(2) Preparation of the A-Site Ordered Perovskite Oxide Catalyst by the Ordinary-Pressure Synthetic Process Using the precursor obtained above (1), the ordinary pressure synthesis was performed at 950° C. in the air for 12 hours, and the A-site ordered perovskite oxide catalyst $CaMn_7O_{12}$ was produced. The X-ray diffraction profile of the product is shown in FIG. 17. From this profile, it was confirmed that the product is the A-site ordered perovskite structure without an impurity phase. The specific surface area computed from the SEM image was 2.73 $m^2g^{-1}$.

Example of catalyst preparation 5

Preparation of the A-Site Ordered Perovskite Oxide Catalyst $LaMn_7O_{12}$ (Henceforth, it May be Indicated as "$LaMn_3Mn_4O_{12}$" in Order to Specify that it is an A-Site Ordered.)

Figure 18:
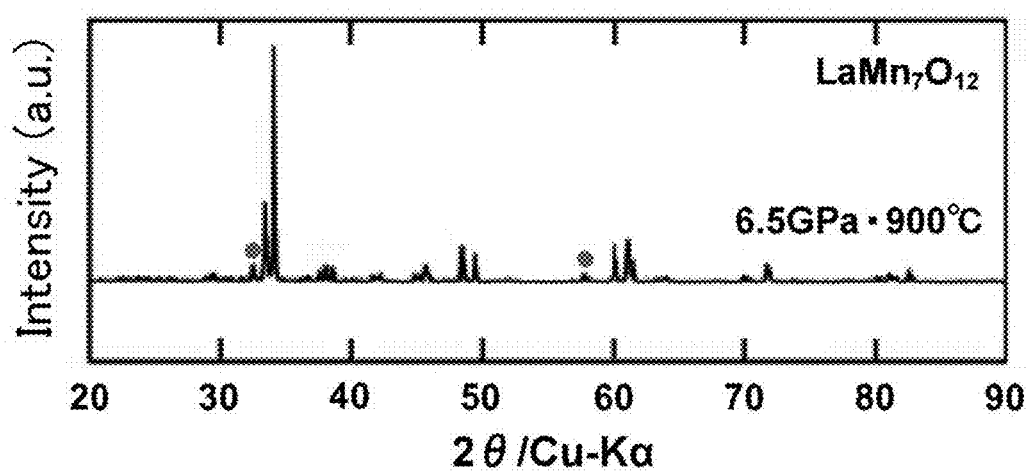
FIG. 18 shows a powder X-ray diffraction pattern (Cu-Kα) of the A-site ordered perovskite oxide catalyst $LaMn_3Mn_4O_{12}$ (it is of the same meaning with $LaMn_7O_{12}$) to which the present invention is applied. Round marks represent the impurity peaks of $LaMnO_3$ origin in the figure. Here, 6.5 GPa-900° C. is a synthesizing pressure-temperature of the oxide catalyst.

(1) Preparation of the A-site ordered perovskite oxide catalyst by the high-pressure synthetic process $La_2O_3$ and MnO (both from Wako Pure Chem Co.) were mixed so that they become a molar ratio of 1:14, and according to the example 1 (2) of the catalyst preparation, the high-pressure synthesis was performed for 30 minutes at 6.5 GPa and 700° C. using the Kawai type high-pressure synthesis device. It was confirmed that the obtained oxide was the A-site ordered perovskite oxide catalyst $LaMn_7O_{12}$ although mixing of a little impurity phases ($LaMnO_3$) was seen as a result of the powder X-ray diffraction (FIG. 18). The specific surface area computed from the SEM image was 0.48 $m^2g^{-1}$.

Example 1

Oxygen Generation Catalyst Performance of the A-Site Ordered Perovskite Oxide Catalyst ($CaCu_3Fe_4O_{12}$ (Abbreviated as CCFO))

Using a catalyst electrode of the A-site ordered perovskite oxide obtained above, an electrochemical characteristic of the OER catalyst was measured by using a Pt wire electrode as a counter electrode, and an Hg/HgO electrode filled with a 0.10 M-KOH aqueous solution as a reference electrode. All measurements were carried out in oxygen-saturated atmosphere at room temperature by fixing a reversible electrode potential of an $O_2/H_2O$ redox couple to 0.304 V vs. Hg/HgO (1.23V vs. RHE). The electric potential of a glassy carbon portion modified with the catalyst for the catalyst characterization of the A-site ordered perovskite oxide to the OER reaction was controlled by 0.3-0.9 V vs. Hg/HgO (1.23-1.83 V vs. RHE) at an electric potential sweep rate of 10 $mVs^{-1}$. In the following Examples, all of the OER electric current are shown on the basis of a relative electric current value per presumed surface area of the A-site ordered perovskite oxide catalyst. A relative electric current value per oxide catalyst weight may be shown supplementary. And, after rectifying iR drops by a resistance component (it has been decided by an alternating-current-impedance method to be about 43 ohms) of an electrolyte, the electric potential is shown as the electric potential (E-iR/V vs. RHE) of a RHE basis.

Figure 9:
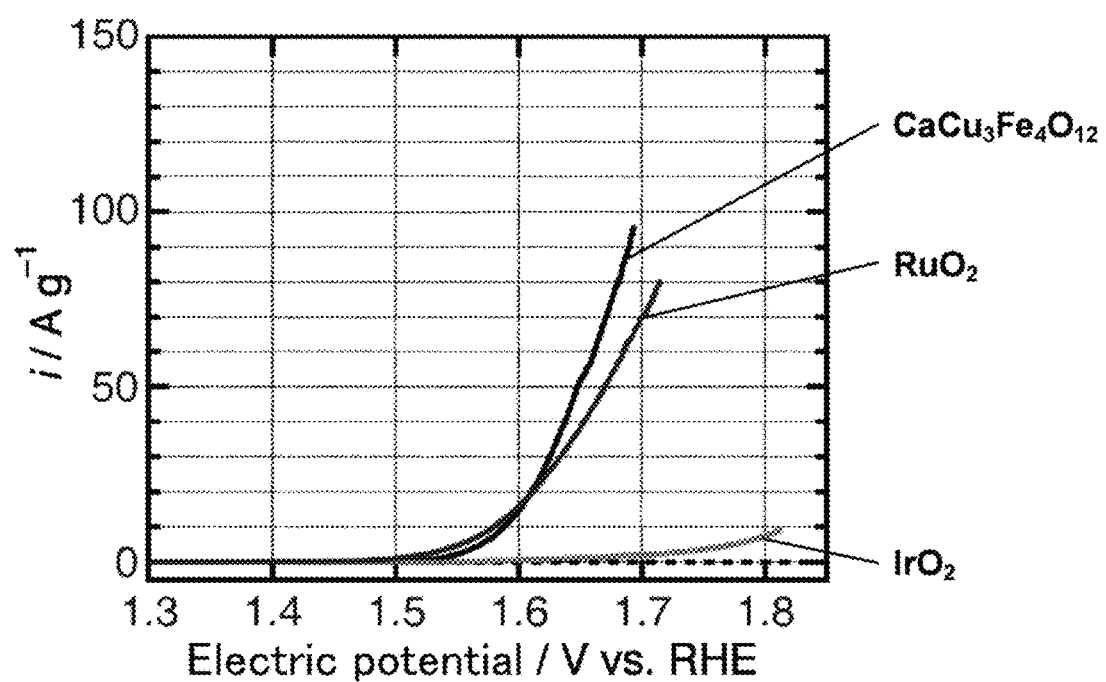
FIG. 9 shows the result of measuring the OER electric current with respect to the sweep electric potential per catalyst unit mass of the A-site ordered perovskite oxide catalyst ($CaCu_3Fe_4O_{12}$ (abbreviated as CCFO)) to which the present invention is applied (OER current-potential curve) (Example 1). The results of measuring the current-potential curves for $RuO_2$ and $IrO_2$ as conventional catalysts are also shown as comparative examples.
Figure 10:
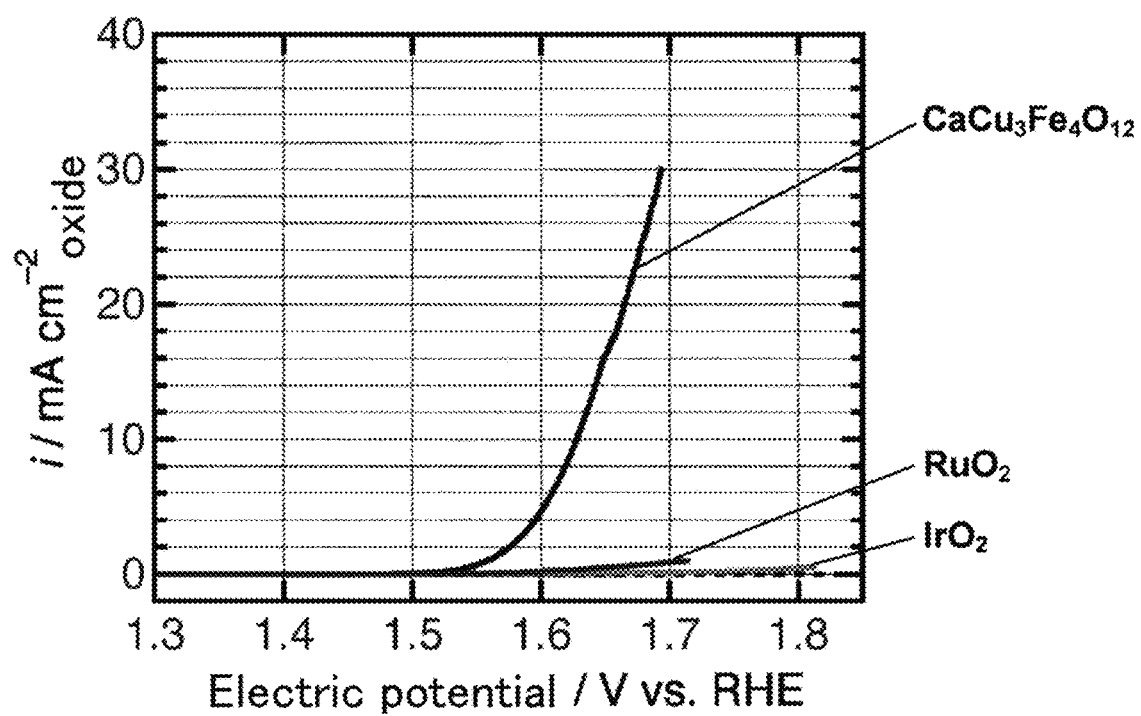
FIG. 10 shows the result of measuring the OER electric current with respect to the sweep electric potential per catalyst unit surface area of the A-site ordered perovskite oxide catalyst ($CaCu_3Fe_4O_{12}$ (abbreviated as CCFO)) to which the present invention is applied (OER current-potential curve) (Example 1). The results of the measuring the current-potential curve of $RuO_2$ and $IrO_2$ which are conventional catalysts are also shown as comparative examples.

FIG. 9 and FIG. 10 show the results (OER current-potential curve) (Example 1) of measuring the OER electric current to the sweep electric potential of the A-site ordered perovskite oxide catalyst ($CaCu_3Fe_4O_{12}$ (abbreviated as CCFO)) to which the present invention is applied. The results of measuring the current-potential curves of $RuO_2$ and $IrO_2$ as the conventional catalyst are also shown as comparative examples. FIG. 9 shows the OER current-potential curve per catalyst unit mass, and FIG. 10 shows the OER current-potential curve per catalyst unit surface area. It turns out that the catalyst performance of CCFO exceeded the performances of $RuO_2$ and $IrO_2$ both in per catalyst unit mass and in per catalyst unit surface area.

Example 2

Oxygen-Generation Catalyst Performance of the A-Site Ordered Perovskite Oxide Catalyst $ACu_3Fe_4O_{12}$ ("A" Represents Ca, Sr, Y, La, or Ce.)

Figure 11:
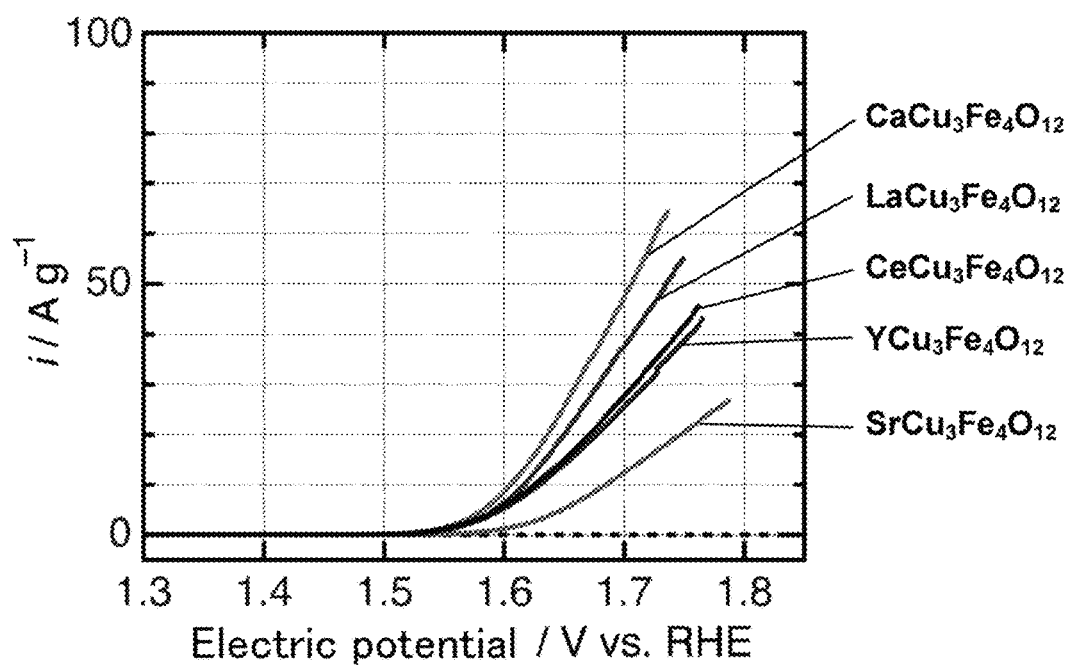
FIG. 11 shows the results of measuring the OER electric current with respect to the sweep electric potential per unit mass of the A-site ordered perovskite oxide catalysts $ACu_3Fe_4O_{12}$ (abbreviated as ACFO; A=Ca, Sr, Y, La or Ce) to which the present invention is applied (OER current-potential curve).
Figure 12:
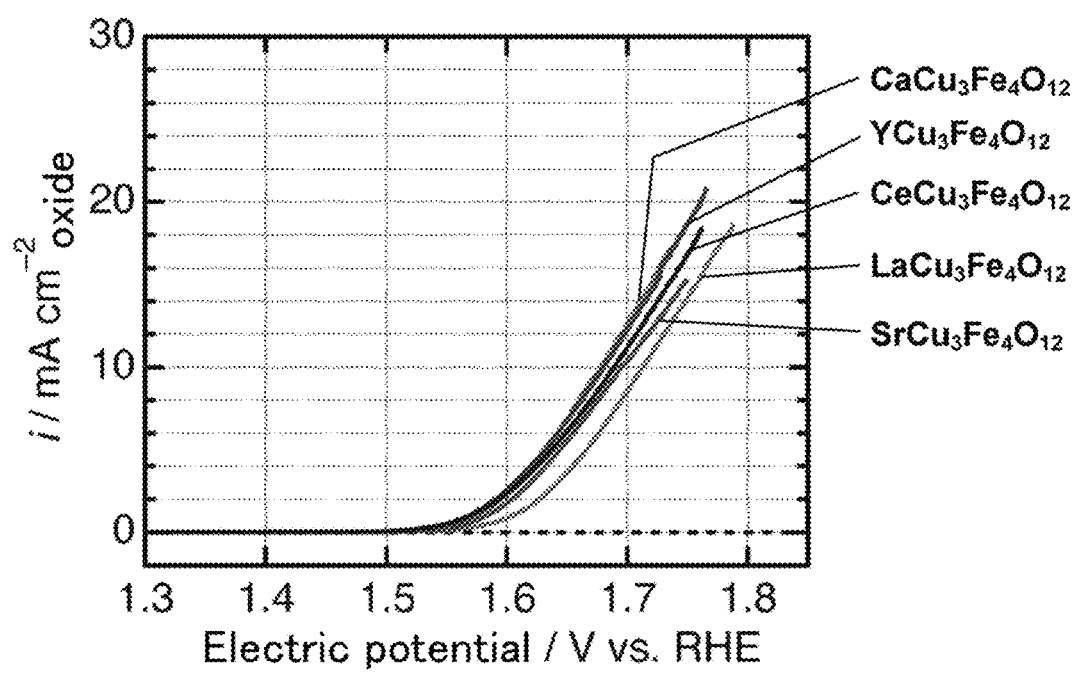
FIG. 12 shows the result of measuring the OER electric current with respect to the sweep electric potential per unit surface area of the A-site ordered perovskite oxide catalysts $ACu_3Fe_4O_{12}$ (abbreviated as ACFO; A=Ca, Sr, Y, La or Ce) to which the present invention is applied (OER current-potential curve).

FIG. 11 and FIG. 12 show the measurement results of the OER electric current to the sweep electric potential of the A-site ordered perovskite oxide catalyst $ACu_3Fe_4O_{12}$ to which the present invention is applied, wherein the oxide catalyst is abbreviated to "ACFO", and "A" represents Ca, Sr, Y, La, or Ce. In the measurement, the catalyst layer on glassy carbon has the following composition: 0.25 mg-oxide $cm^{-2}$-disk, 0.05 mg-AB $cm^{-2}$-disk, and 0.05 mg-Nafion $cm^{-2}$-disk. FIG. 11 represents the OER current-potential curve per unit mass, and FIG. 12 represents the OER current-potential curve per unit surface area, respectively.

When compared in per unit surface area, it turns out that there is no significant difference of the catalyst performance between ACFOs.

Example 3

Durability During Repetition Uses of the A-Site Ordered Perovskite Oxide Catalyst $CaCu_3Fe_4O_{12}$ (CCFO)

Figure 13:
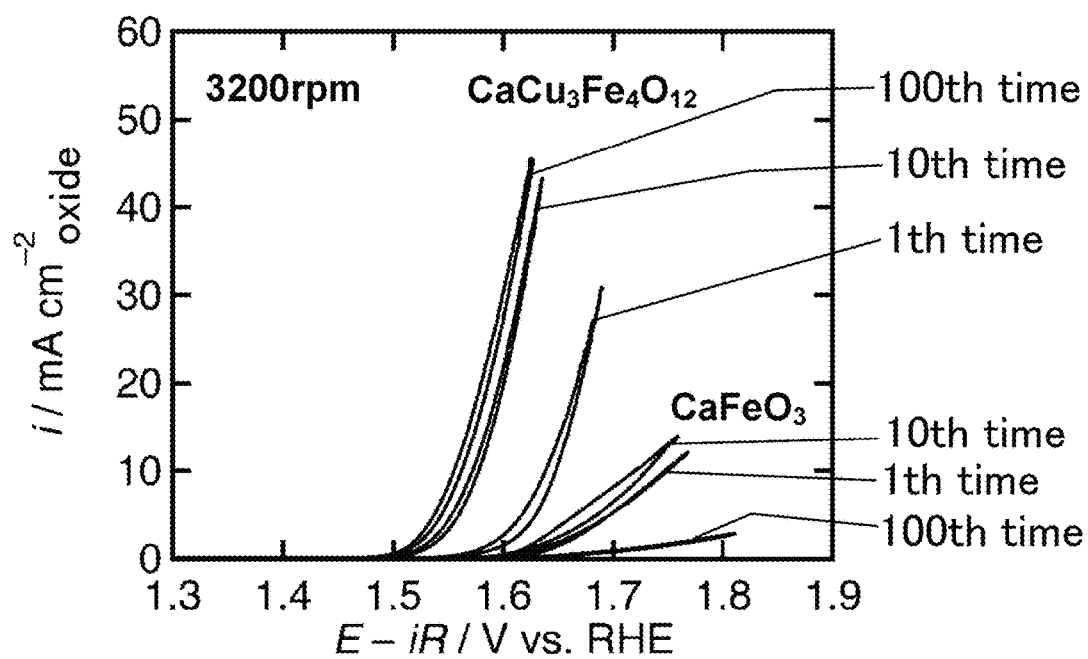
FIG. 13 shows a comparison of durability in the case of repetition uses between the A-site ordered perovskite oxide catalyst $CaCu_3Fe_4O_{12}$(CCFO) to which the present invention is applied and a simple perovskite oxide $CaFeO_3$ catalyst, and also shows current-potential curves in the case of repetition uses (up to 100th time).
Figure 14:
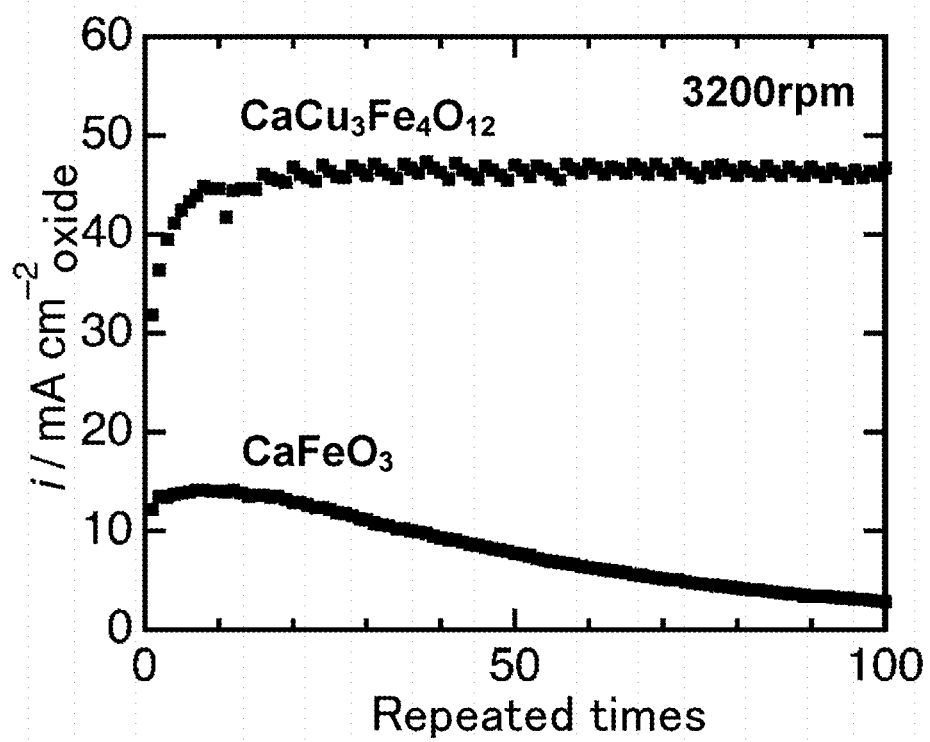
FIG. 14 shows a comparison of durability in the case of repetition uses between the A-site ordered perovskite oxide catalyst $CaCu_3Fe_4O_{12}$(CCFO) to which the present invention is applied and a simple perovskite oxide $CaFeO_3$ catalyst, and also shows changes of the OER current density in the case of repeated-uses (up to 100th time).

FIG. 13 and FIG. 14 show the measurement result of the durability during the repetition uses in OER of the A-site ordered perovskite oxide catalyst $CaCu_3Fe_4O_{12}$ (CCFO) to which the present invention is applied. In this measurement, in order to remove the oxygen bubbles adhering to an electrode disk, disk rotation frequency was made into 3200 times per minute. As a comparative example, the durability measurement result during repetition uses of a simple perovskite oxide $CaFeO_3$ catalyst is also shown together in FIG. 13 and FIG. 14. FIG. 13 represents the OER current-potential curve during repeated use (at 100th time), and FIG. 14 represents the change of the current density during repeated use (at 100th time). It turns out that CCFO of the A-site ordered perovskite oxide catalyst has high catalytic activity and durability for OER as compared with the simple perovskite oxide.

Example 4

Oxygen-Generation Catalyst Performance of the A-Site Ordered Perovskite Oxide Catalyst $CaCu_3B_4O_{12}$ (B Represents Fe, Mn, Ru, or Ti)

Figure 15:
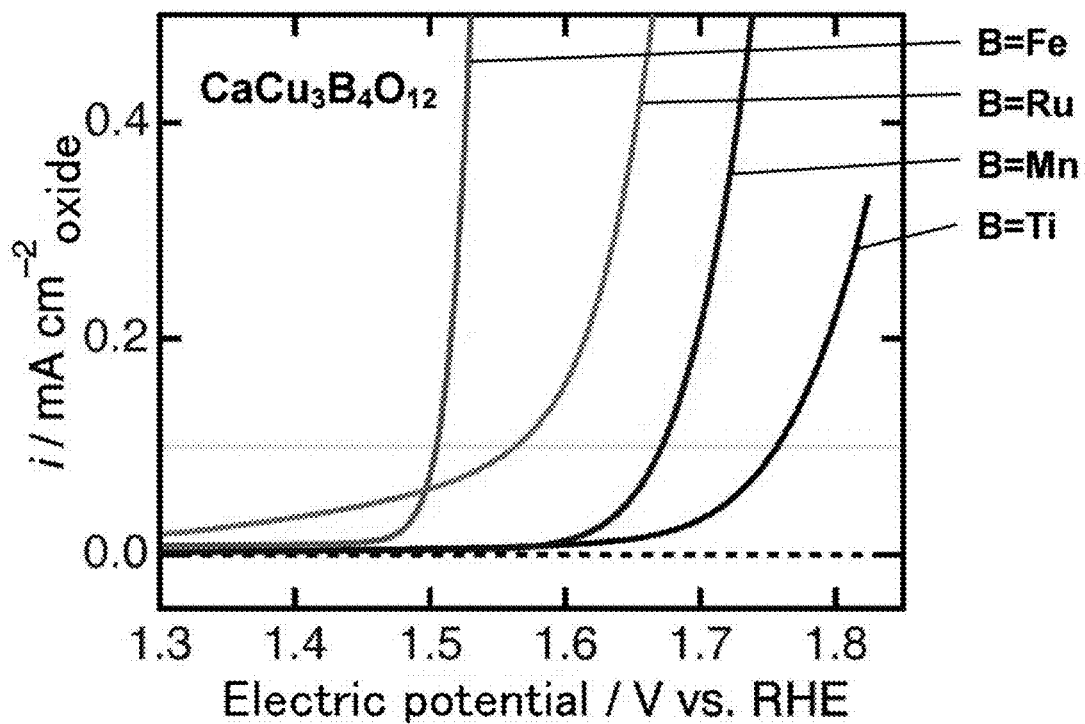
FIG. 15 shows enlarged views of rising parts of the OER current-potential curves by the A-site ordered perovskite oxide catalysts $CaCu_3B_4O_{12}$ (B=Ti, Mn, Fe, or Ru) to which the present invention is applied.

FIG. 15 shows the enlargement of the rising portion of the current-potential curve of OER by the A-site ordered perovskite oxide catalyst $CaCu_3B_4O_{12}$ (B represents Fe, Mn, Ru, or Ti) to which the present invention is applied. It turns out that the overvoltage decreases in monotone and the catalyst performance is improving according to the order of Ti, Mn, Ru, and Fe of the transition metal B in the B site.

Example 5

OER Catalyst Performance of the A-Site Ordered Perovskite Oxide Catalyst $AMn_3Mn_4O_{12}$ (a Represents La or Ca in the Formula)

Figure 16:
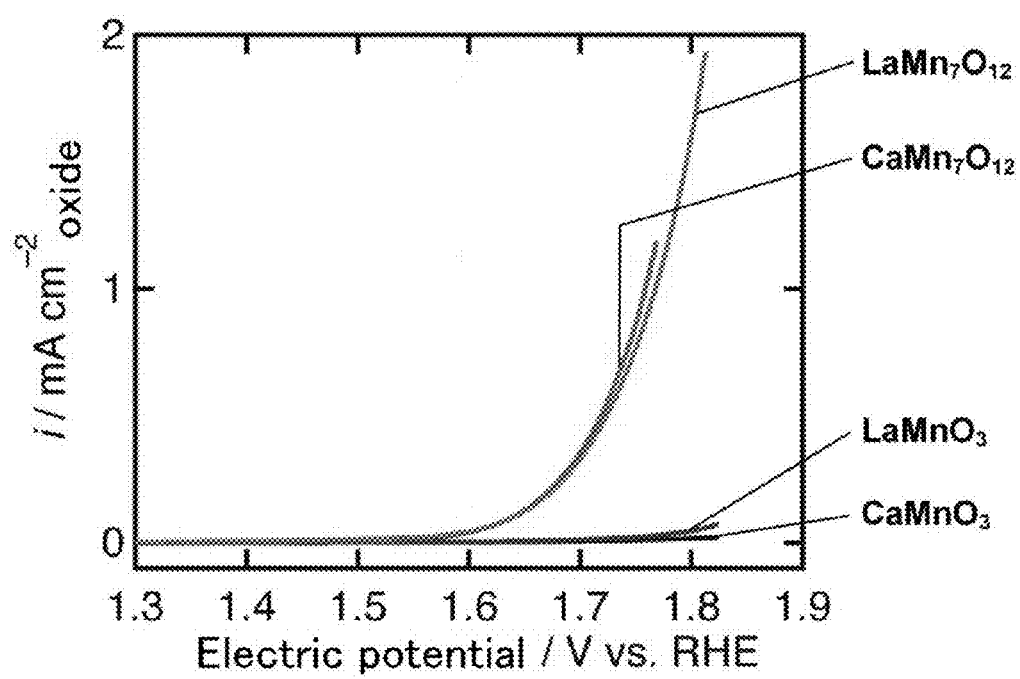
FIG. 16 shows the OER current-potential curves of the A-site ordered perovskite oxide catalysts $AMn_3Mn_4O_{12}$ (A=La or Ca) to which the present invention is applied. As a comparative example, the OER current-potential curves of usual type perovskite oxide catalysts $AMnO_3$ (wherein, A is the same as above) are also shown together. The notation of $LaMn_7O_{12}$ is synonymous with the A-site ordered perovskite oxide $LaMn_3Mn_4O_{12}$. Similarly, the notation of $CaMn_7O_{12}$ is synonymous with the A-site ordered perovskite oxide $CaMn_3Mn_4O_{12}$ (it is the same hereafter).

FIG. 16 represents the OER current-potential curve of the A-site ordered perovskite oxide catalyst $AMn_3Mn_4O_{12}$ ("A" represents La or Ca) to which the present invention is applied. As a comparative example, the OER current-potential curves of $LaMnO_3$ and $CaMnO_3$ which are simple perovskite type oxides are also shown together. In addition, in the figure, $LaMn_7O_{12}$ and $CaMn_7O_{12}$ are synonymous with the A-site ordered perovskite oxides $LaMn_3Mn_4O_{12}$ and $CaMn_3Mn_4O_{12}$, respectively. Rising of the OER current-potential curve of the A-site ordered perovskite oxide catalyst is steeper than that of the simple perovskite oxide catalyst in FIG. 16. Therefore, it turns out that the OER catalyst performance of the A-site ordered perovskite oxide catalyst is superior to that of the simple perovskite oxide catalyst.

Example 6

Figure 19:
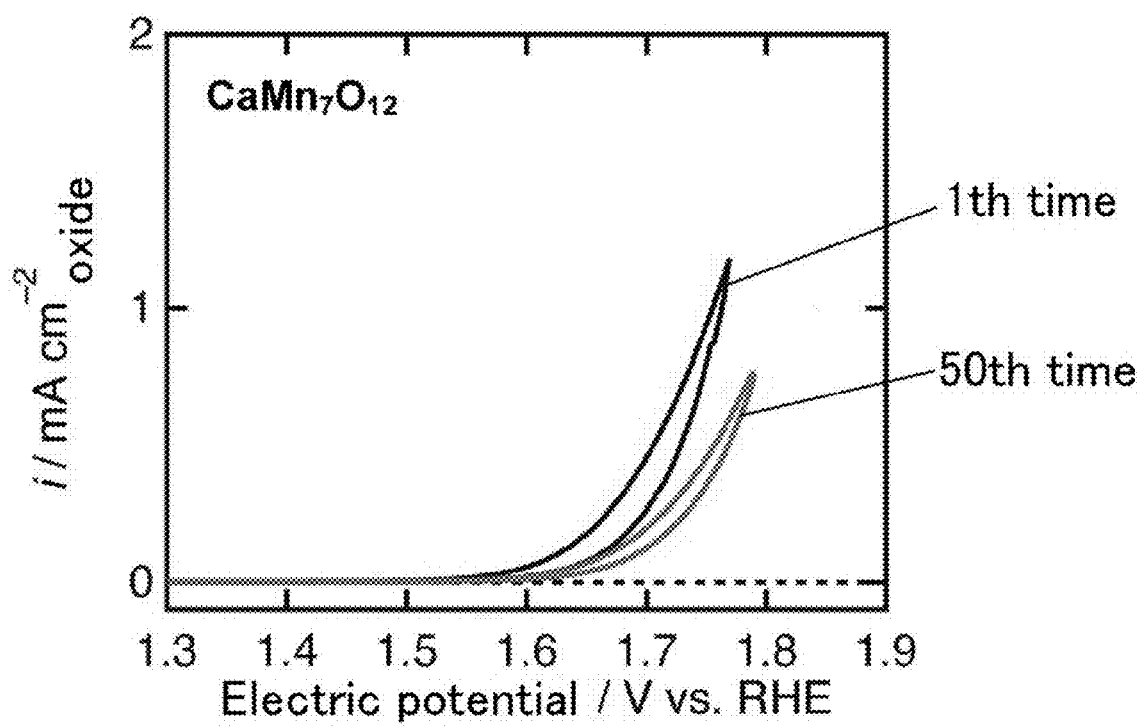
FIG. 19 shows a durability at repeated-uses of the OER catalyst performance (OER current-potential curve) of the A-site ordered perovskite oxide catalyst $CaMn_3Mn_4O_{12}$ in which the present invention is applied (Example 6).
Figure 20:
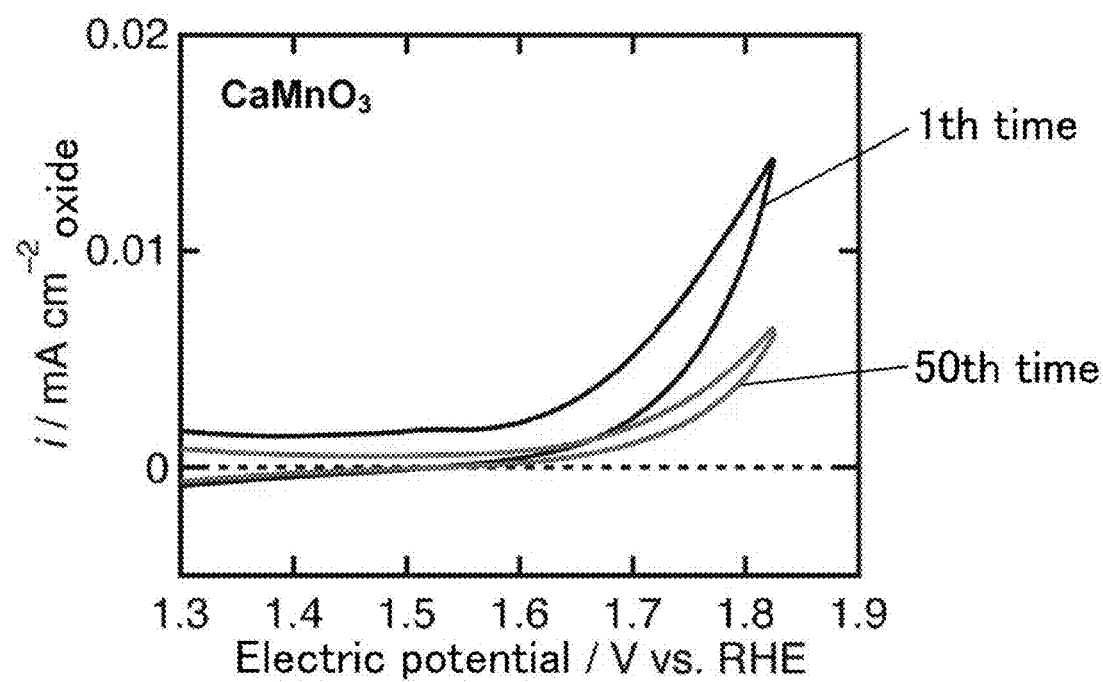
FIG. 20 shows a durability at repeated-uses of the OER catalyst performance (OER current-potential curve) of a simple perovskite oxide catalyst $CaMnO_3$ as a comparative example.

Durability During Repetition Uses of the OER Catalyst Performance of the A-Site Ordered Perovskite Oxide Catalyst $CaMn_3Mn_4O_{12}$ FIG. 19 shows the durability measurement result (OER current-potential curve) during the repetition uses in OER of the A-site ordered perovskite oxide catalyst $CaMn_3Mn_4O_{12}$ (it is synonymous with $CaMn_7O_{12}$) to which the present invention is applied. As a comparative example, the durability measurement result (OER current-potential curve) during repetition uses of the simple perovskite oxide $CaMnO_3$ catalyst is also shown altogether in FIG. 20. It turns out that the A-site ordered perovskite oxide catalyst $CaMn_3Mn_4O_{12}$ has high OER catalytic activity and durability as compared with the simple perovskite oxide catalyst.

Example 7

Figure 21:
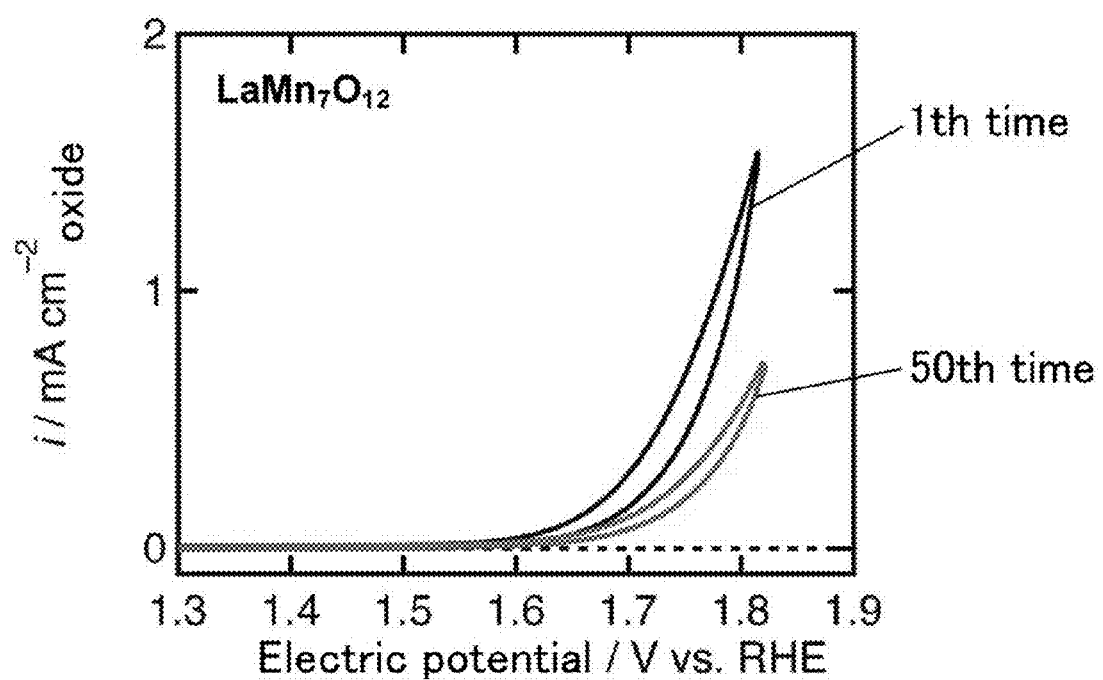
FIG. 21 shows a durability at repeated-uses of the OER catalyst performance (OER current-potential curve) of the A-site ordered perovskite oxide catalyst $LaMn_7O_{12}$ (this being of the same meaning with $LaMn_3Mn_4O_{12}$) in which the present invention is applied (Example 7).
Figure 22:
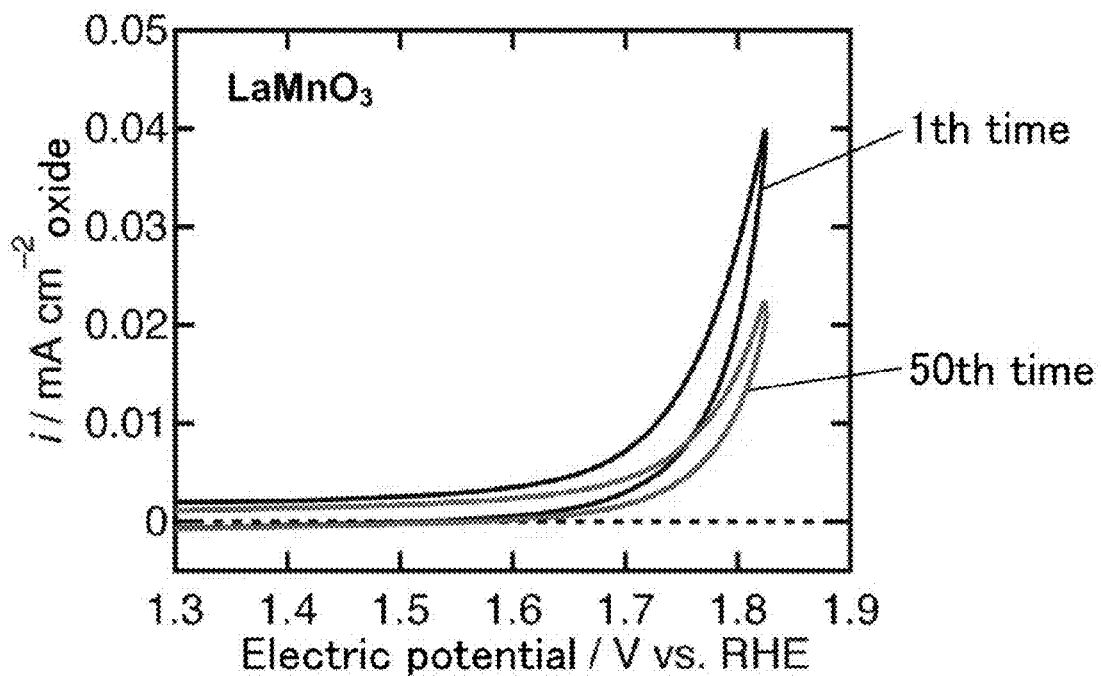
FIG. 22 shows a durability at repeated-uses of the OER catalyst performance (OER current-potential curve) of the simple perovskite oxide $LaMnO_3$ catalyst as a comparative example.

Durability During Repetition Uses of the OER Catalyst Performance of the A-Site Ordered Perovskite Oxide Catalyst $LaMn_3Mn_4O_{12}$ FIG. 21 shows the measurement result of the durability during the repetition uses in OER (OER current-potential curve) of the A-site ordered perovskite oxide catalyst $LaMn_3Mn_4O_{12}$ (it is synonymous with $LaMn_7O_{12}$) to which the present invention is applied. As a comparative example, the durability measurement result (OER current-potential curve) during repetition uses of the simple perovskite oxide catalyst $LaMnO_3$ is also shown in FIG. 22. The rising of the OER current-potential curve of the A-site ordered perovskite oxide catalyst $LaMn_3Mn_4O_{12}$ is steep, as compared with the simple perovskite oxide catalyst, and after repetition use, the steep nature is maintained. This represents that the A-site ordered perovskite oxide catalyst has an outstanding OER catalytic activity and durability as compared with the simple perovskite oxide catalyst.

Performance Comparison 1

Figure 23:
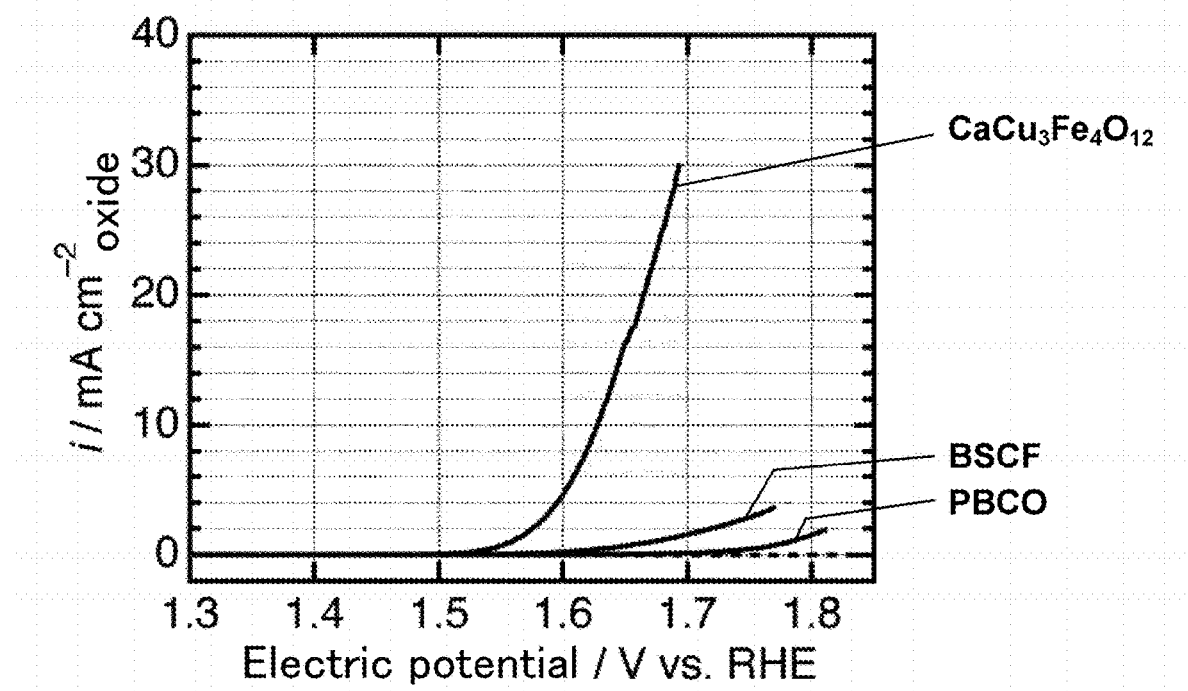
FIG. 23 shows a comparison between the OER current-potential-curve of the A-site ordered perovskite oxide catalyst $CaCu_3Fe_4O_{12}$ (abbreviated as CCFO) to which the present invention is applied (Example 1) and the OER current-potential-curves of simple perovskite oxide catalysts of comparative examples. Two kinds of simple perovskite oxide catalysts shown here: $(Ba_{0.5}Sr_{0.5})Co_{0.5}Fe_{0.2}O_{3-\delta}$ (abbreviated as BSCF: Refer to non-patent cited-references 5 and 7) of J.-I. Jung et al., and $(Pr_{0.5}Ba_{0.5})CoO_{3-\delta}$ (abbreviated as PBCO: Refer to non-patent cited-reference 4) of A. Grimaud et al. are said to have the highest activity for the OER in the perovskite oxide catalysts reported as an academic paper until now.

Comparison of the OER Catalyst Performances Between the A-Site Ordered Perovskite Oxide Catalyst and the Simple Perovskite Oxide Catalyst FIG. 23 represents comparisons of the OER current-potential curve (Example 1) of the $CaCu_3Fe_4O_{12}$ catalyst (abbreviated as CCFO) of the present invention with the OER current-potential curves of $(Ba_{0.5}Sr_{0.5})Co_{0.8}Fe_{0.2}O_{3-\delta}$ (abbreviated as BSCF) of J.-I. Jung et al. (nonpatent document 5) and $(Pr_{0.5}Ba_{0.5})CoO_{3-\delta}$ (abbreviated as PBCO) of A. Grimaud etc. (nonpatent document 4). Two kinds of simple perovskite oxides shown here are presumed to have the highest catalytic activity to OER in the perovskite oxide catalysts reported as academic papers until now. Accordingly, it turns out from FIG. 23 that the CCFO catalyst of the present invention has the excellent catalytic performance compared with these simple perovskite oxides known before.

Performance Comparison 2

Figure 24:
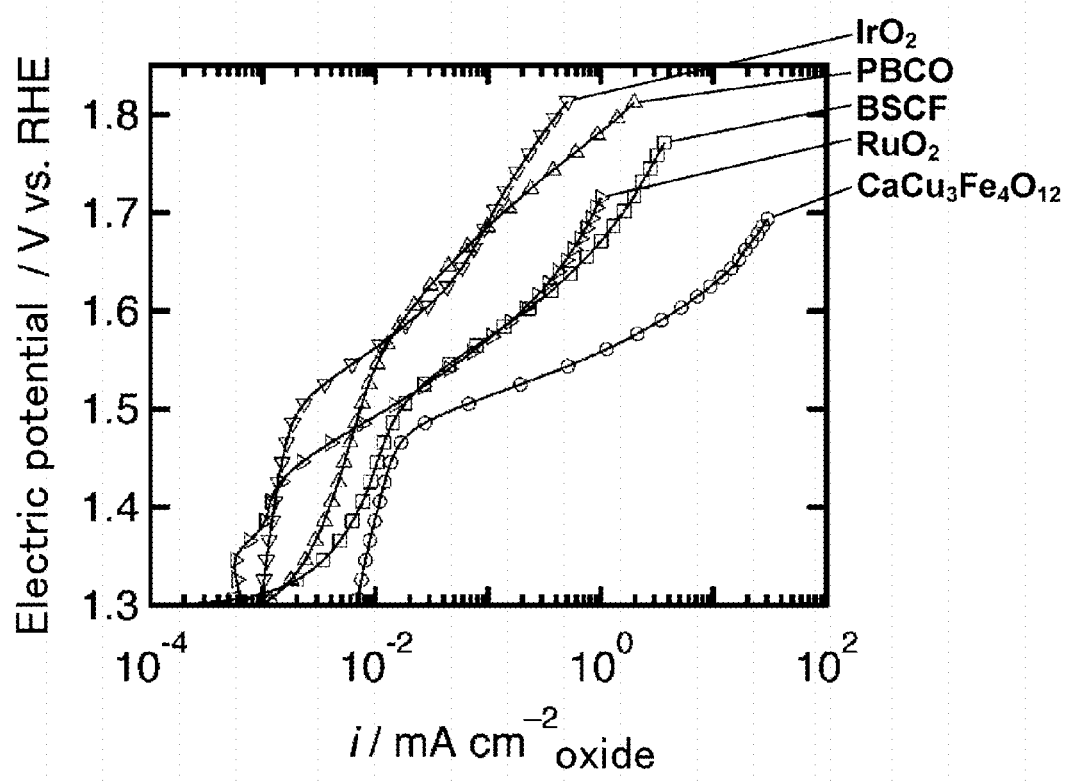
FIG. 24 shows a comparison between the OER potential-current-curve of the CCFO catalyst to which the present invention is applied and the OER potential-current-curves of BSCF, PBCO, $RuO_2$, and $IrO_2$.

Comparison of the OER Catalyst Performances Between the A-Site Ordered Perovskite Oxide Catalyst, the Simple Perovskite Oxide Catalyst and a Noble Metal Oxide Catalyst FIG. 24 shows comparisons of the OER electric potential and an electric current curve of the CCFO catalyst to which the present invention is applied, and the OER electric potentials and electric current curves of BSCF, PBCO, $RuO_2$, and $IrO_2$ catalysts. From this figure, it turns out that, in CCFO, one digit to several digits greater electric current (horizontal axis) flows at the same electric potential value (vertical axis) when compared with others, and accordingly, the oxygen evolution reaction (OER) occurs efficiently.

Performance Comparison 3

Performance Comparison with the Catalyst Shown in the Patent Document 1

Figure 1:
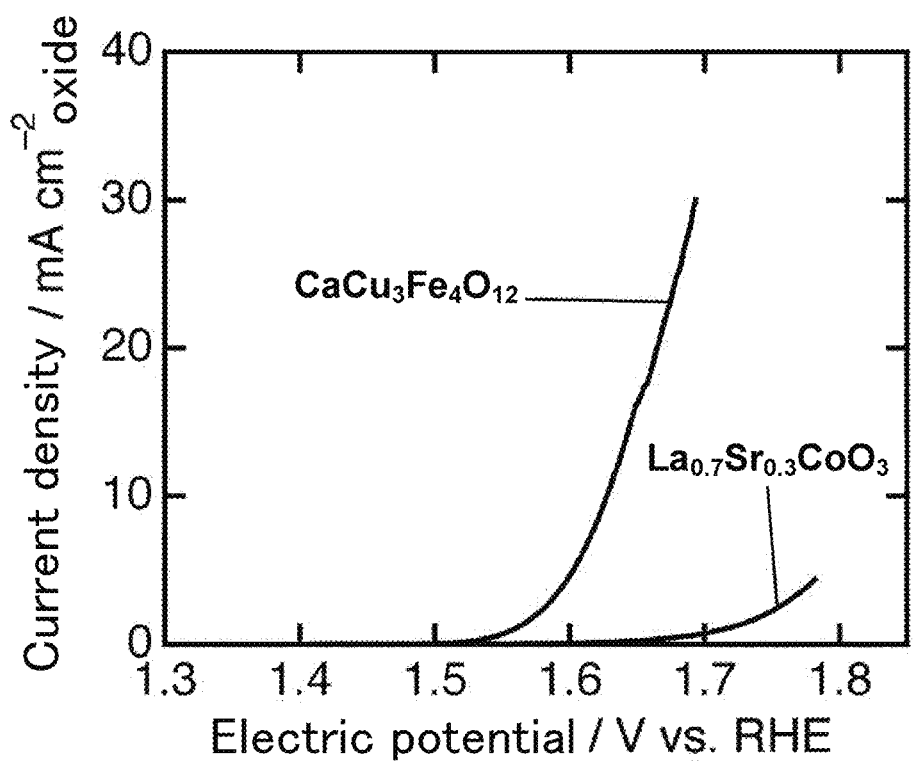
FIG. 1 shows a comparison between the result of a measurement of the OER electric current per catalyst unit surface area vs. the sweep electric potential (OER current-potential curve: Example 1) on the A-site ordered perovskite oxide catalyst ($CaCu_3Fe_4O_{12}$: abbreviated as CCFO) to which the present invention is applied, and the OER current-potential curve of a simple perovskite oxide catalyst $La_{0.7}Sr_{0.3}CoO_3$ as a comparative example (refer to patent document 1).
Figure 2:
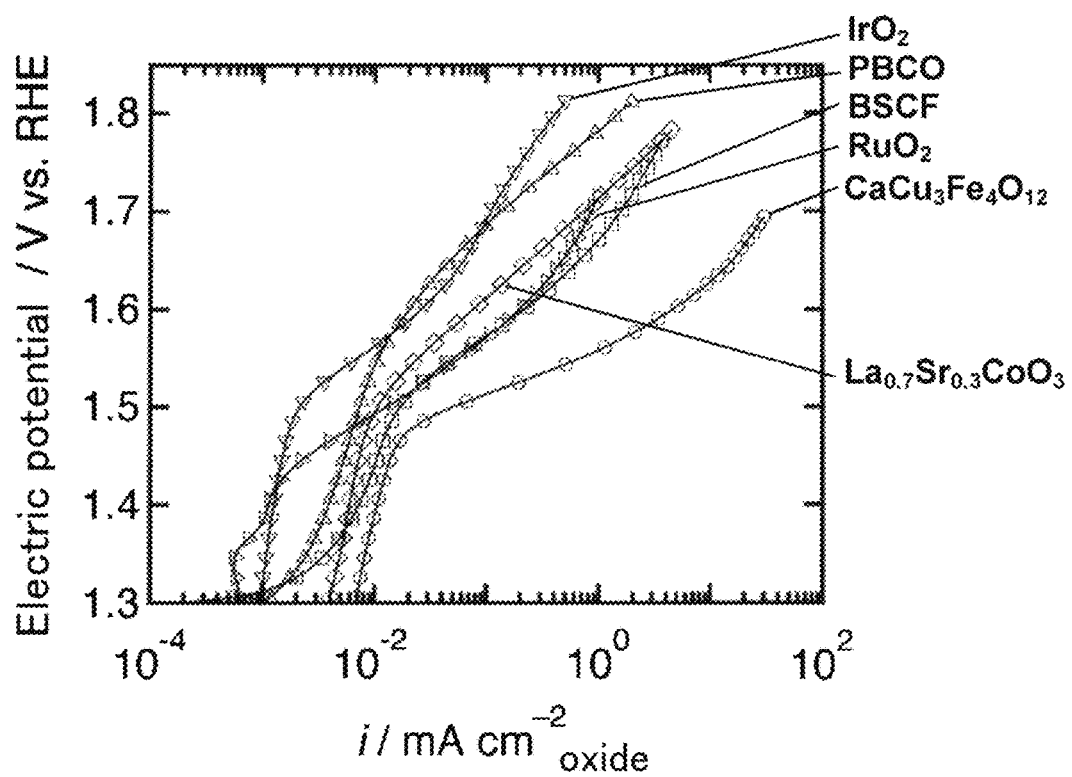
FIG. 2 is shows a comparison between the OER electric potential and the electric current curve of the CCFO catalyst to which the present invention is applied, and the OER electric potential and the electric current curve of other catalysts. Other catalysts used are simple perovskite oxide catalysts $La_{0.7}Sr_{0.3}CoO_3$ (refer to patent document 1), $(Ba_{0.5}Sr_{0.5})Co_{0.8}Fe_{0.2}O_{3-\delta}$ (abbreviated as BSCF: refer to non-paten cited references 5 and 7) of J.-I. Jung et al. and $(Pr_{0.5}Ba_{0.5})CoO_{3-\delta}$ (abbreviated as PBCO: refer to non-patenting cited reference 4.) of A. Grimaud et al, and a noble metal oxide catalysts $RuO_2$ and $IrO_2$.

Comparisons of the oxygen generation catalyst performances between $La_{0.7}Sr_{0.3}CoO_3$ of the patent documents 1 and $CaCu_3Fe_4O_{12}$ of the present invention are shown in FIG. 1 and FIG. 2. The catalyst of the present invention showed far good performances.

INDUSTRIAL APPLICABILITY

The A-site ordered perovskite oxide catalyst ($CaCu_3Fe_4O_{12}$ etc.) of the present invention has high catalytic activity as a catalyst for the oxygen evolution reaction compared with the expensive noble-metal oxide catalysts such as $RuO_2$, $IrO_2$ etc. from the past. It is extremely stable also under oxidative catalytic reaction conditions, and it is a catalyst for oxygen evolution reaction with a long repetition use life. As a result, use for the charge reaction of the metal-air battery or the important energy conversion reaction in the direct water decomposition reaction by sunlight is expected as the oxygen evolution reaction catalyst excellent in cost effectiveness. Similarly the method for the oxygen evolution reaction using the A-site ordered perovskite oxide catalyst, and the catalyst composition containing the A-site ordered perovskite oxide, are expected for use in the practical energy conversion reaction as the oxygen evolution reaction method and the catalyst composition thereof which are more excellent in cost effectiveness compared with the oxygen generation method and the catalyst composition thereof using the noble-metal oxide catalyst from the past.

What is claimed is:

1. A catalyst composition comprising:
    a catalyst comprising an A-site ordered perovskite oxides. represented by the chemical formula (1): $AA'_3B_4O_{12}$, wherein A represents at least one metallic element selected from the group consisting of Na, K, Ca, Sr, Ba, Ag, Pb, Bi, Y, La, Ce, Pr, Nd, Sm, Eu, Gd, Tb, Dy, Ho, Er, Tm, Yb and Lu, A' represents at least one transition metal element selected from the group consisting of Cu, Mn, Fe, Co and Pd, and forms a covalent bond, and B represents at least one metallic element selected from the group consisting of Ti, V, Cr, Mn, Fe, Co, Ru, Rh, Re, Ir, Pt, Al, Ga, Ge, Sn and Sb; and
    a carrier.

2. The catalyst composition according to claim 1, wherein an ionic radius of the A-site metal ion is larger than an ionic radius of the A'-site metal ion in the A-site ordered perovskite by 0.37Å or more.

3. The catalyst composition according to claim 1, wherein the A-site ordered perovskite oxide is the A-site ordered perovskite oxide represented by the chemical formula (2): $A^{I}Cu_3Fe_4O_{12}$, wherein $A^{I}$ represents at least one metallic element selected from the group consisting of Ca, Sr, Y, La and Ce, and this Cu has a covalent bond.

4. The catalyst composition according to claim 1, wherein the A-site ordered perovskite oxide is the A-site ordered perovskite oxide represented by the chemical formula (3): $CaCu_3B^{I}_4O_{12}$, wherein Cu has a covalent bond and $B^{I}$ is at least one transition metal element selected from the group consisting of Ti, Mn, Fe and Ru.

5. The catalyst composition according to claim 1, wherein the A-site ordered perovskite oxide is the A-site ordered perovskite oxide which is represented by the chemical formula (4):
    $CaCu_3Fe_4O_{12}$, and this Cu has a covalent bond.

6. The catalyst composition according to claim 1, wherein the A-site ordered perovskite oxide is an A-site ordered perovskite oxide represented by the chemical formula (5): $A^{II}Cu_3B^{II}_4O_{12}$ or the chemical formula (6): $A^{II}Mn_3B^{II}_4O_{12}$, wherein $A^{II}$ represents at least one metallic element selected from the group consisting of Ca, La, Pr, Nd, Sm, Eu, Gd, Tb, Dy, Ho, Er, Tm, Yb and Lu, and $B^{II}$ represents Ti, Mn, Ru or ($Fe_{0.5}$+$Sb_{0.5}$).

7. The catalyst composition according to claim 6, wherein the A-site ordered perovskite oxide represented by the chemical formula (5) is $CaCu_3Ti_4O_{12}$, $CaCu_3Ru_4O_{12}$, $CaCu_3(Fe_2Sb_2)O_{12}$ or $CaCu_3(Fe_2Re_2)O_{12}$, or the A-site ordered perovskite oxide represented by the chemical formula (6) is $CaMn_3Mn_4O_{12}$.

8. The catalyst composition according to claim 7 wherein the A-site ordered perovskite oxide is produced by an atmospheric pressure synthetic process.

9. The catalyst composition according to claim 1, wherein the A-site ordered perovskite oxide is produced by a high pressure synthetic process of 1 GPa -20 GPa.

* * * * *